Figure 1:
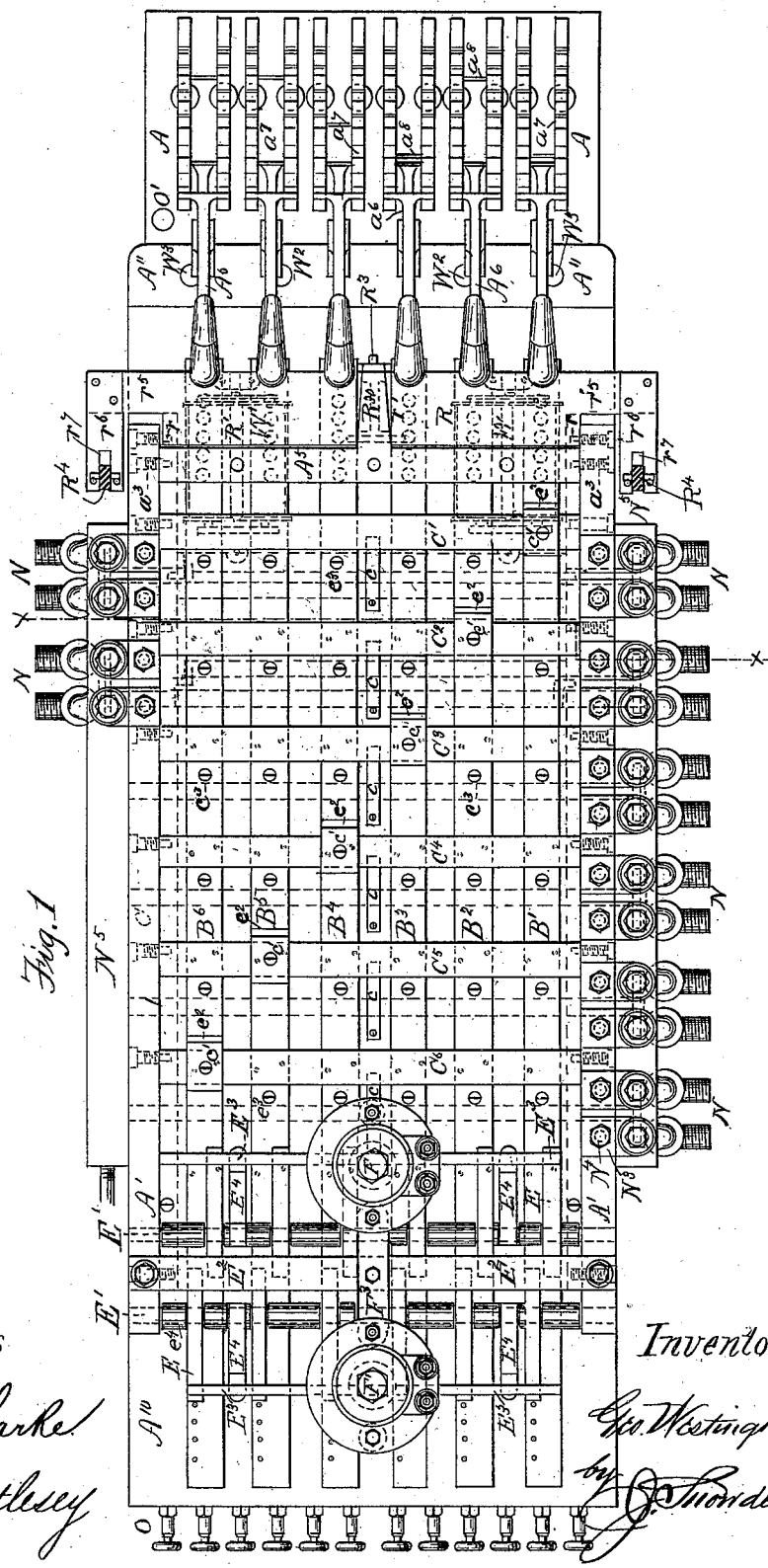

(No Model.) 18 Sheets—Sheet 1.

G. WESTINGHOUSE, Jr.
ELECTRICAL INTERLOCKING MECHANISM FOR SWITCHES AND SIGNALS.

No. 357,109. Patented Feb. 1, 1887.

Witnesses
D. M. Clarke
R. H. Whittlesey

Inventor
Geo. Westinghouse Jr.
by J. Snowden Bell
Atty (No Model.) 18 Sheets—Sheet 3.

G. WESTINGHOUSE, Jr.
ELECTRICAL INTERLOCKING MECHANISM FOR SWITCHES AND SIGNALS.

No. 357,109. Patented Feb. 1, 1887.

Witnesses
C. M. Clarke
R. H. Whittlesey

Inventor
Geo. Westinghouse Jr.
by J. Snowden Bell
atty.

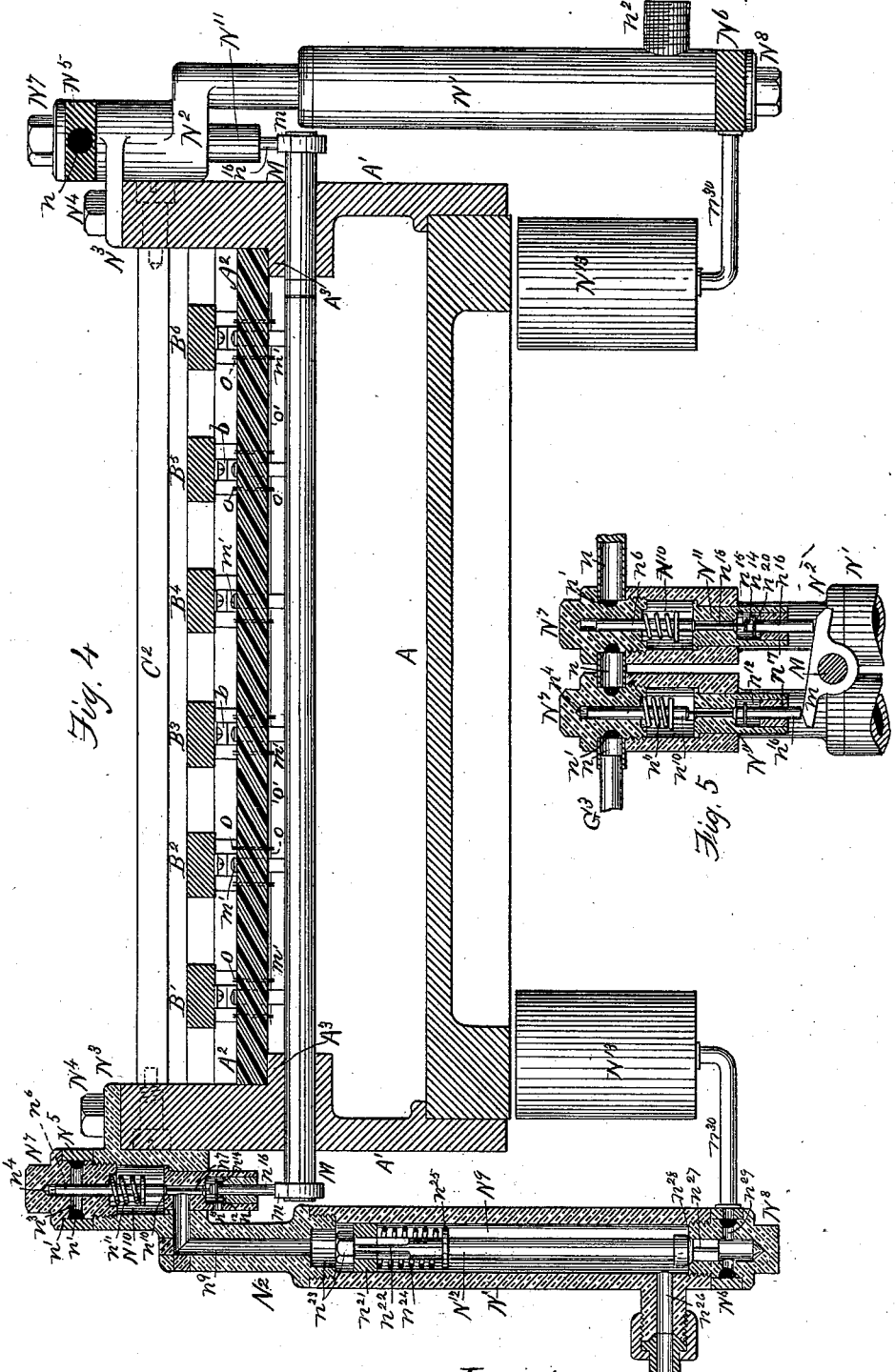

(No Model.) 18 Sheets—Sheet 5.
G. WESTINGHOUSE, Jr.
ELECTRICAL INTERLOCKING MECHANISM FOR SWITCHES AND SIGNALS.
No. 357,109. Patented Feb. 1, 1887.

Witnesses
Inventor (No Model.)  18 Sheets—Sheet 6.
G. WESTINGHOUSE, Jr.
ELECTRICAL INTERLOCKING MECHANISM FOR SWITCHES AND SIGNALS.
No. 357,109.  Patented Feb. 1, 1887.
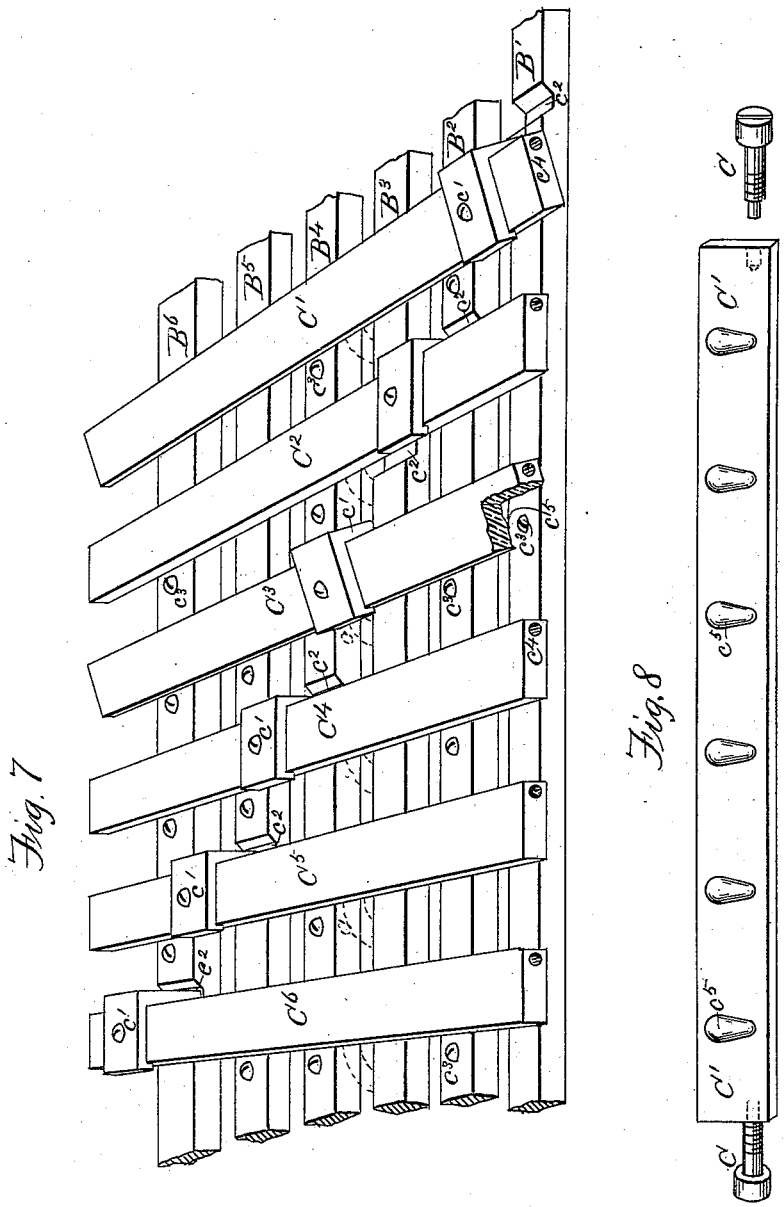

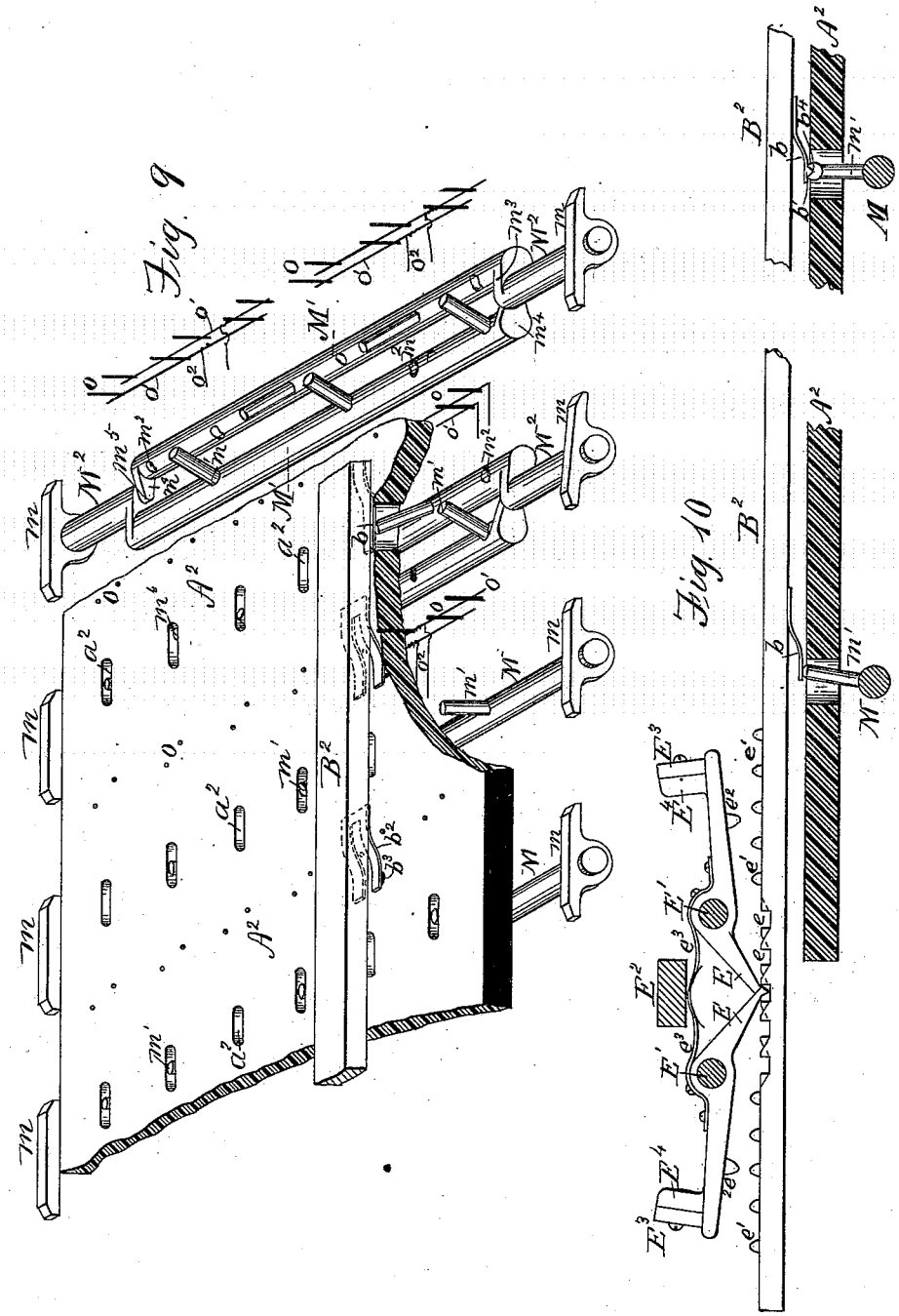

(No Model.) 18 Sheets—Sheet 8.
G. WESTINGHOUSE, Jr.
ELECTRICAL INTERLOCKING MECHANISM FOR SWITCHES AND SIGNALS.
No. 357,109. Patented Feb. 1, 1887.
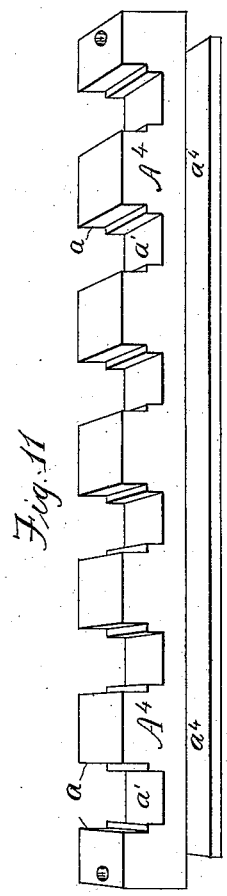
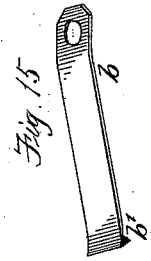
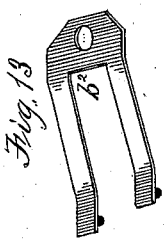
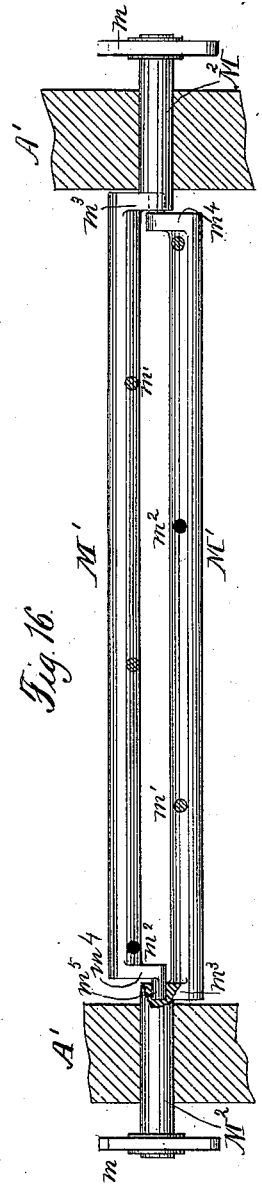
Witnesses: Inventor (No Model.) 18 Sheets—Sheet 9.
G. WESTINGHOUSE, Jr.
ELECTRICAL INTERLOCKING MECHANISM FOR SWITCHES AND SIGNALS.
No. 357,109. Patented Feb. 1, 1887.
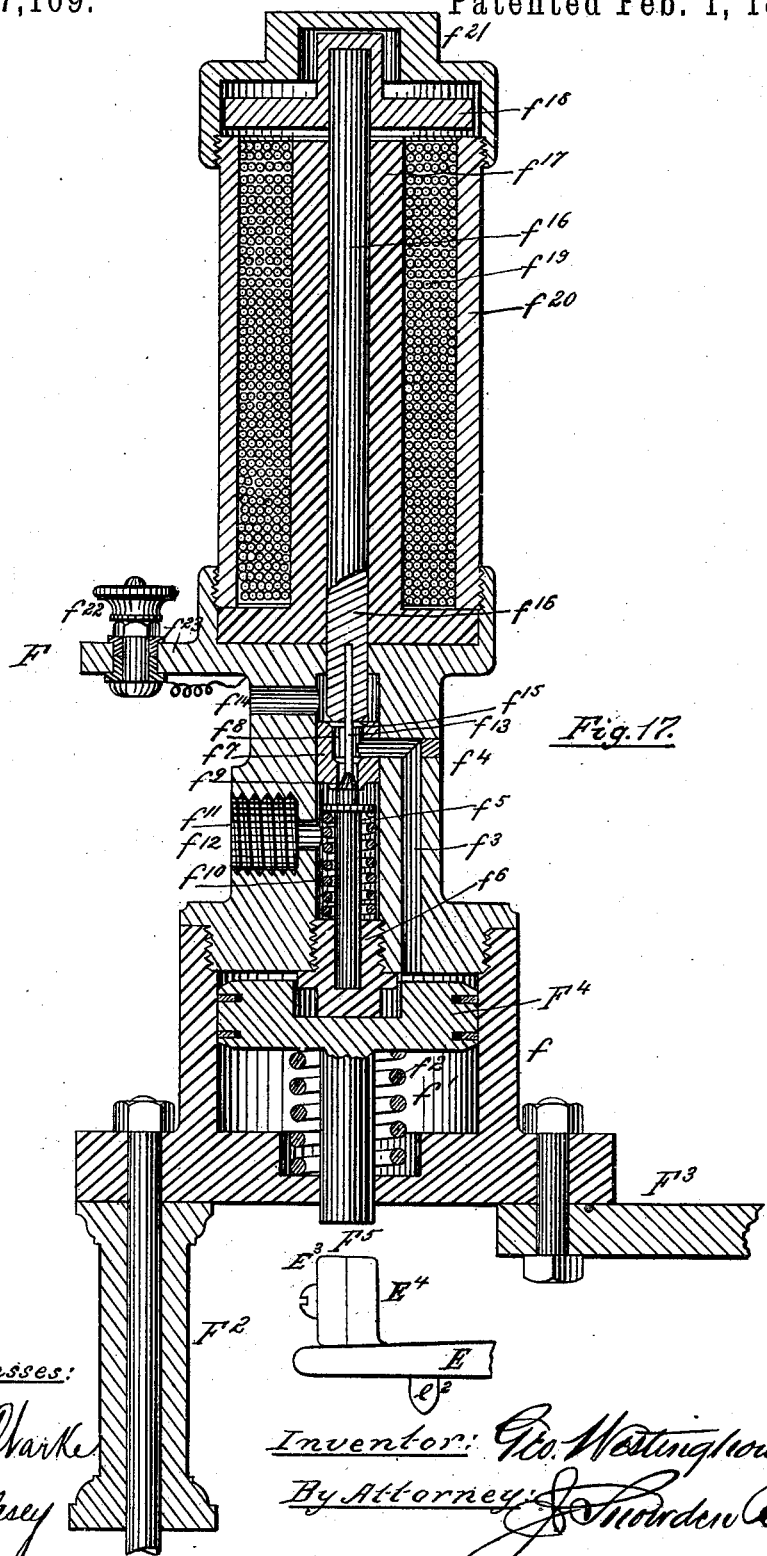

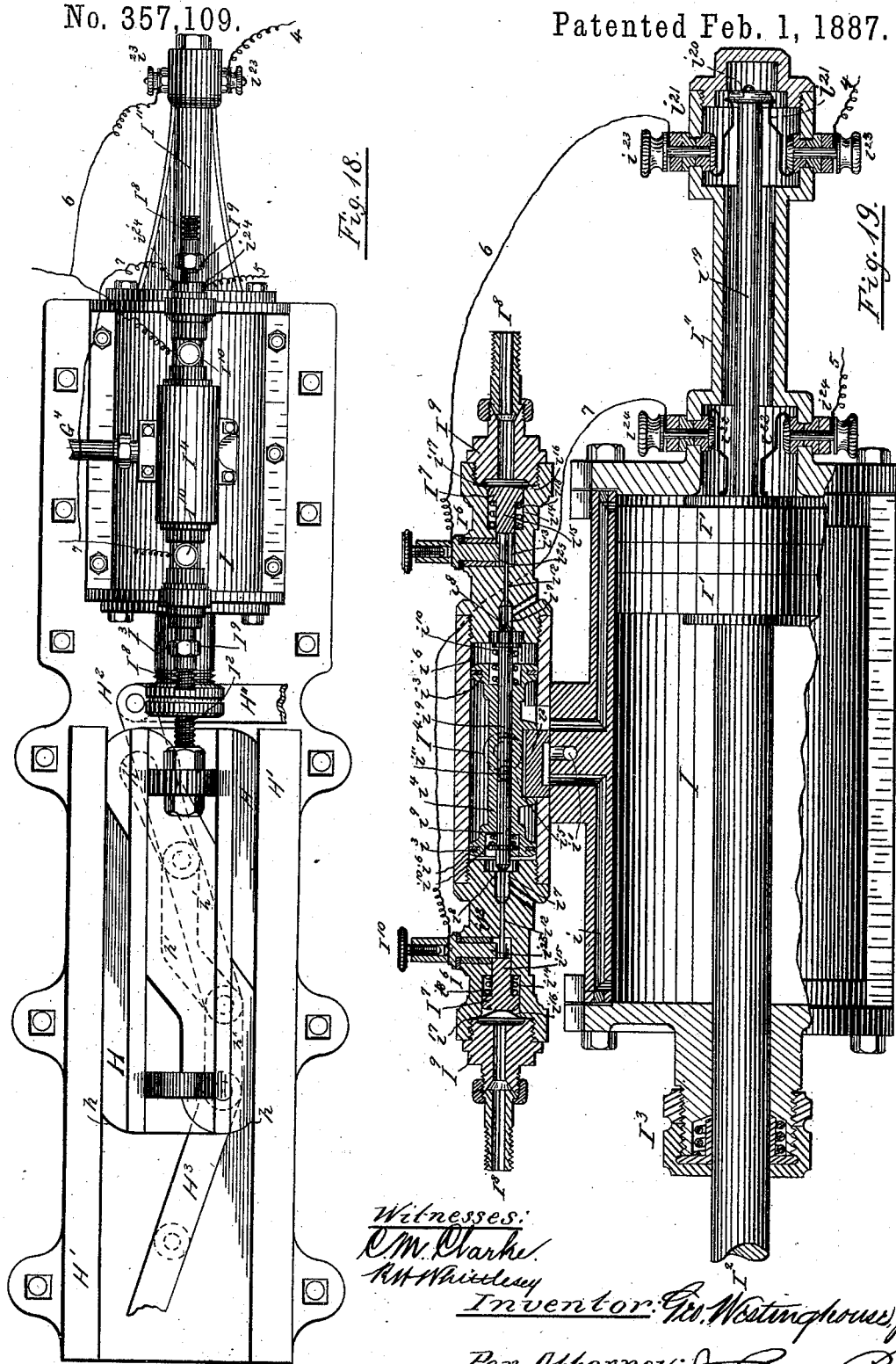

(No Model.) 18 Sheets—Sheet 11.
G. WESTINGHOUSE, Jr.
ELECTRICAL INTERLOCKING MECHANISM FOR SWITCHES AND SIGNALS.
No. 357,109. Patented Feb. 1, 1887.

Witnesses
Inventor (No Model.) 18 Sheets—Sheet 12.
G. WESTINGHOUSE, Jr.
ELECTRICAL INTERLOCKING MECHANISM FOR SWITCHES AND SIGNALS.
No. 357,109. Patented Feb. 1, 1887.
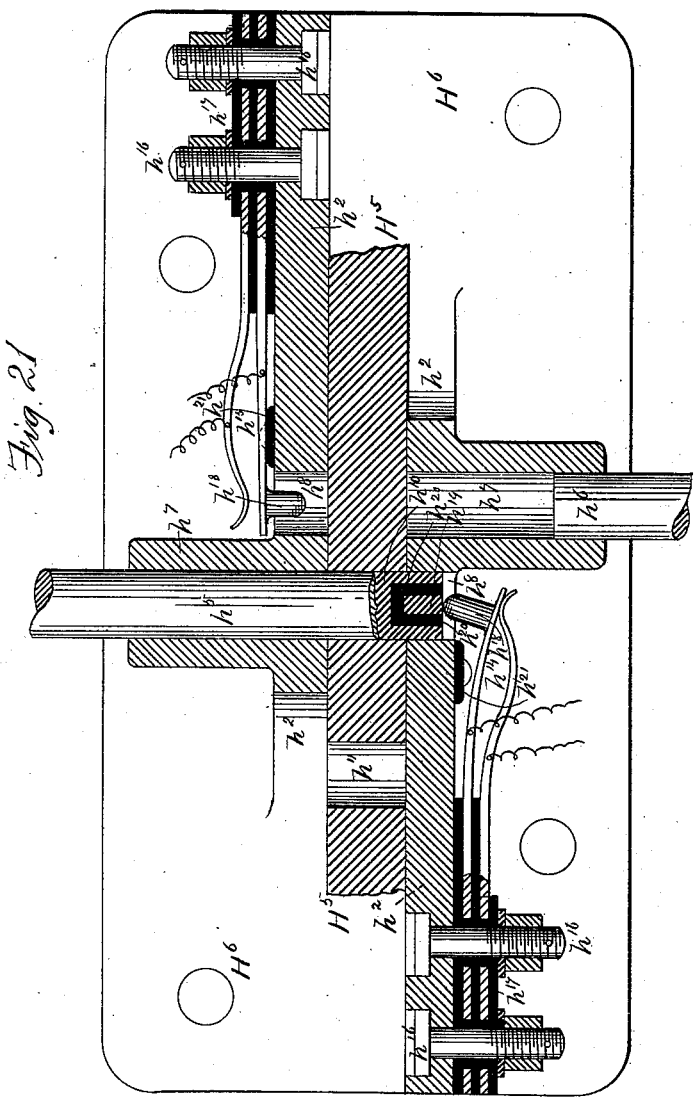

(No Model.) 18 Sheets—Sheet 13.
G. WESTINGHOUSE, Jr.
ELECTRICAL INTERLOCKING MECHANISM FOR SWITCHES AND SIGNALS.
No. 357,109. Patented Feb. 1, 1887.
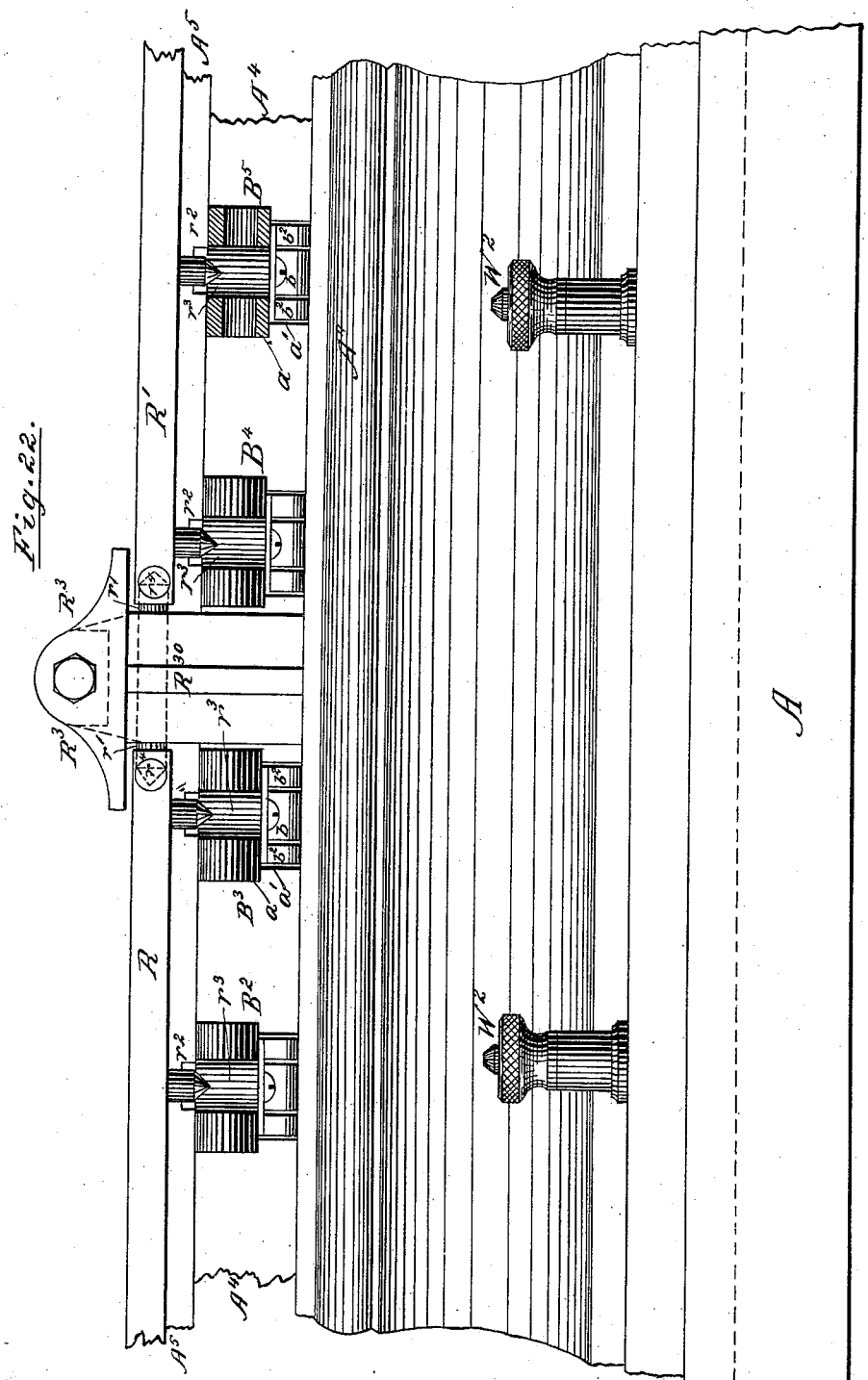

(No Model.) 18 Sheets—Sheet 14.
G. WESTINGHOUSE, Jr.
ELECTRICAL INTERLOCKING MECHANISM FOR SWITCHES AND SIGNALS.
No. 357,109. Patented Feb. 1, 1887.
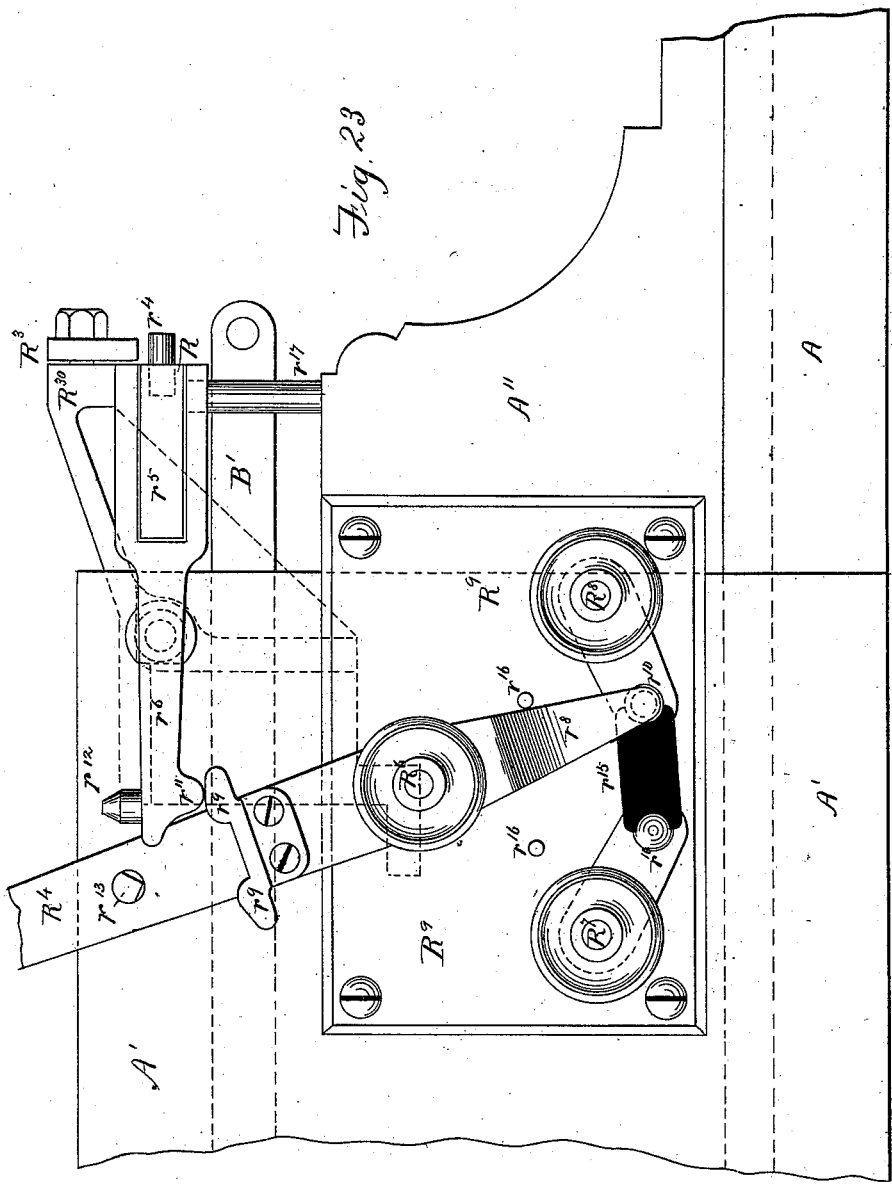

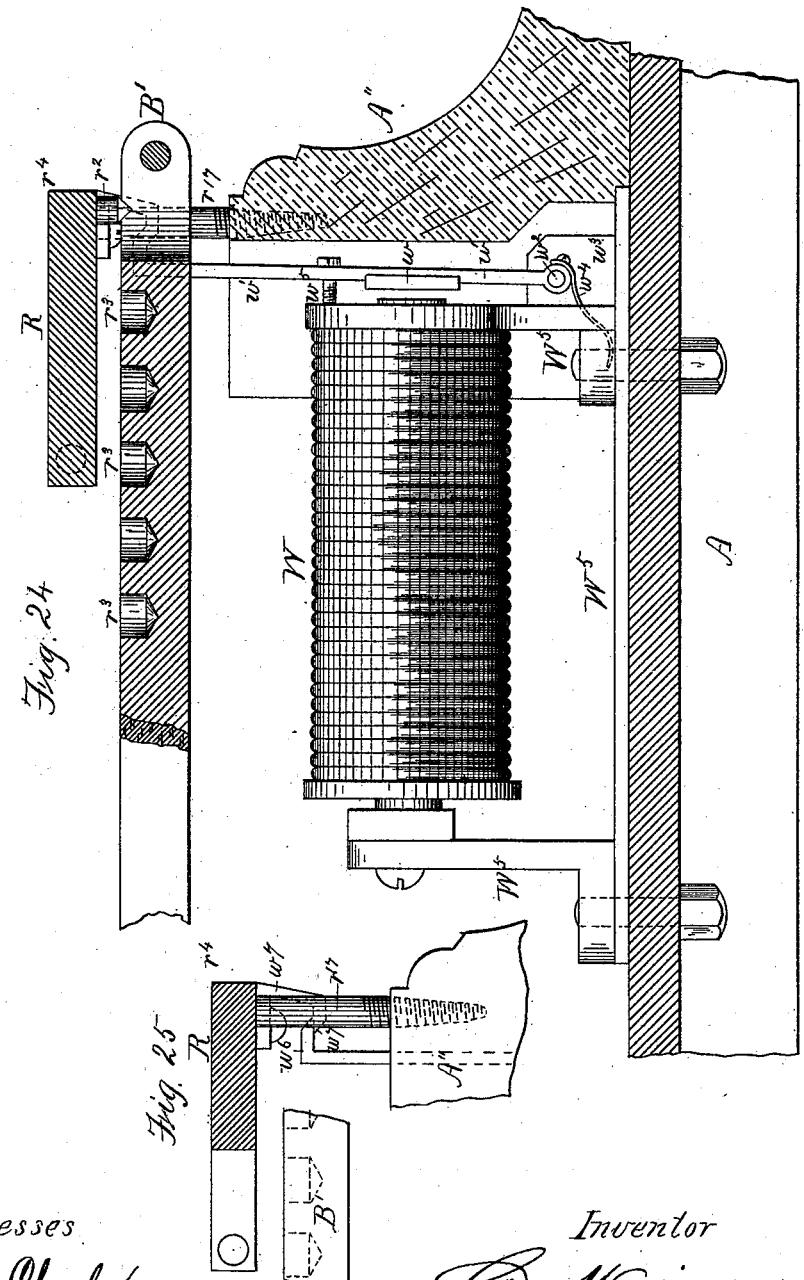

(No Model.) 18 Sheets—Sheet 16.
G. WESTINGHOUSE, Jr.
ELECTRICAL INTERLOCKING MECHANISM FOR SWITCHES AND SIGNALS.
No. 357,109. Patented Feb. 1, 1887.
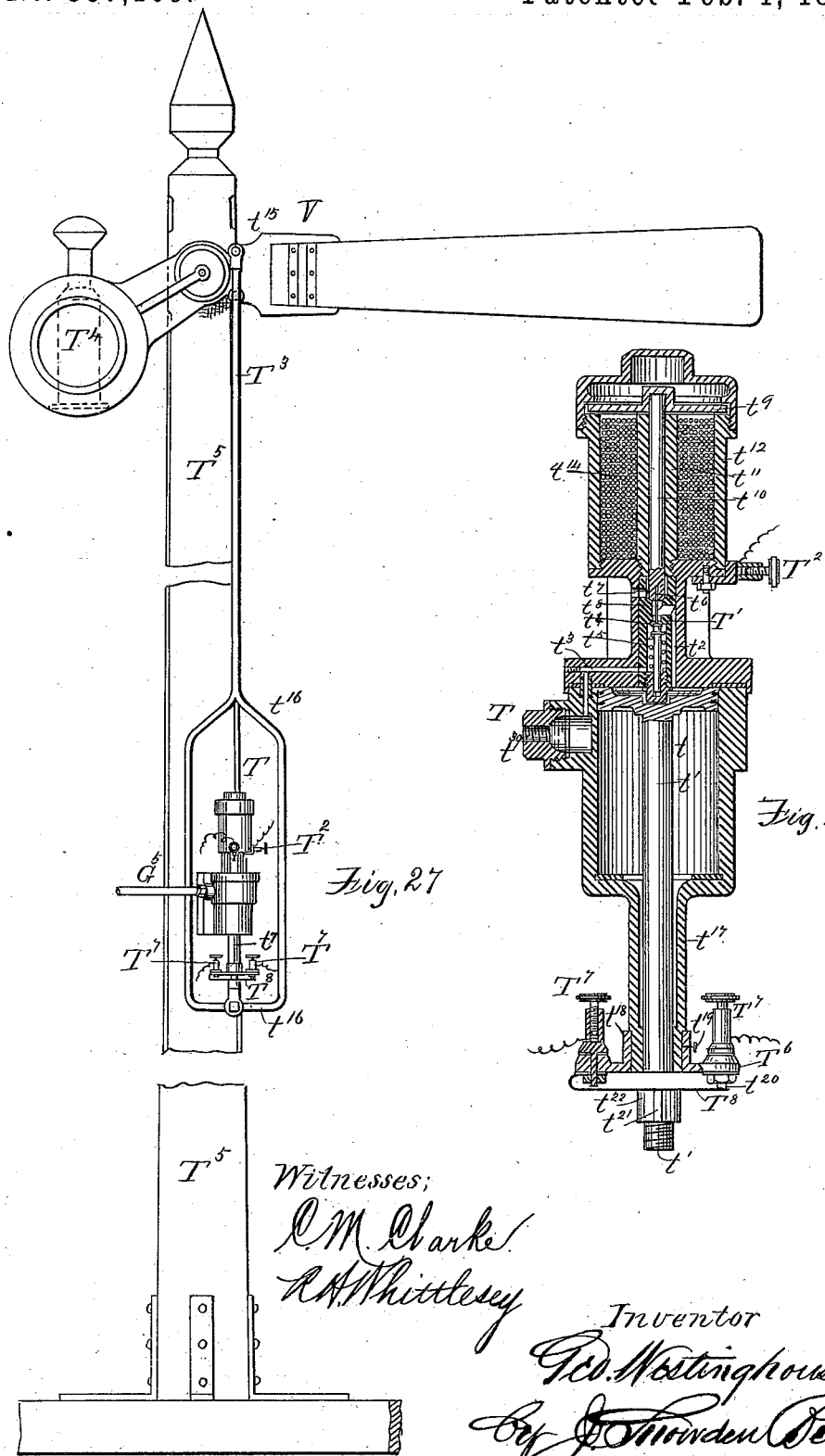

(No Model.) 18 Sheets—Sheet 17.

G. WESTINGHOUSE, Jr.
ELECTRICAL INTERLOCKING MECHANISM FOR SWITCHES AND SIGNALS.

No. 357,109. Patented Feb. 1, 1887.

Witnesses
C. M. Clarke
R. H. Whittlesey

Inventor:
Geo. Westinghouse Jr.
By Attorney
J. Snowden Bell

N. PETERS, Photo-Lithographer, Washington, D. C.

(No Model.)

18 Sheets—Sheet 18.

G. WESTINGHOUSE, Jr.
ELECTRICAL INTERLOCKING MECHANISM FOR SWITCHES AND SIGNALS.

No. 357,109.

Patented Feb. 1, 1887.

Fig. 29.

Witnesses:
C. M. Clarke
R. H. Whittlesey

Inventor:
Geo. Westinghouse Jr.
By Attorney:
J. Snowden Bell

UNITED STATES PATENT OFFICE.

GEORGE WESTINGHOUSE, JR., OF PITTSBURG, PENNSYLVANIA.

ELECTRICAL INTERLOCKING MECHANISM FOR SWITCHES AND SIGNALS.

SPECIFICATION forming part of Letters Patent No. 357,109, dated February 1, 1887.

Application filed August 7, 1886. Serial No. 210,266. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Electrical Fluid-Pressure Interlocking Mechanism for Operating Switches and Signals, of which improvement the following is a specification.

Figure 2:
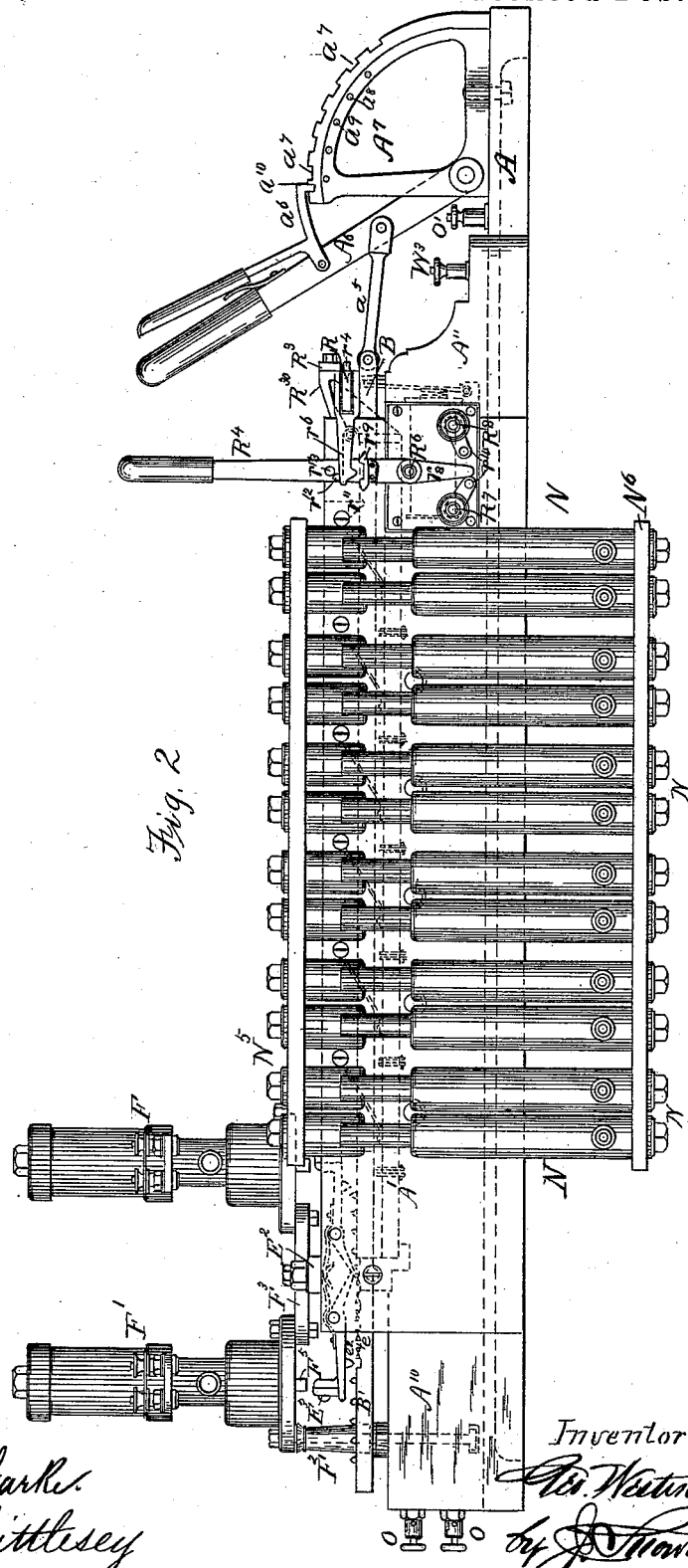
Figure 3:
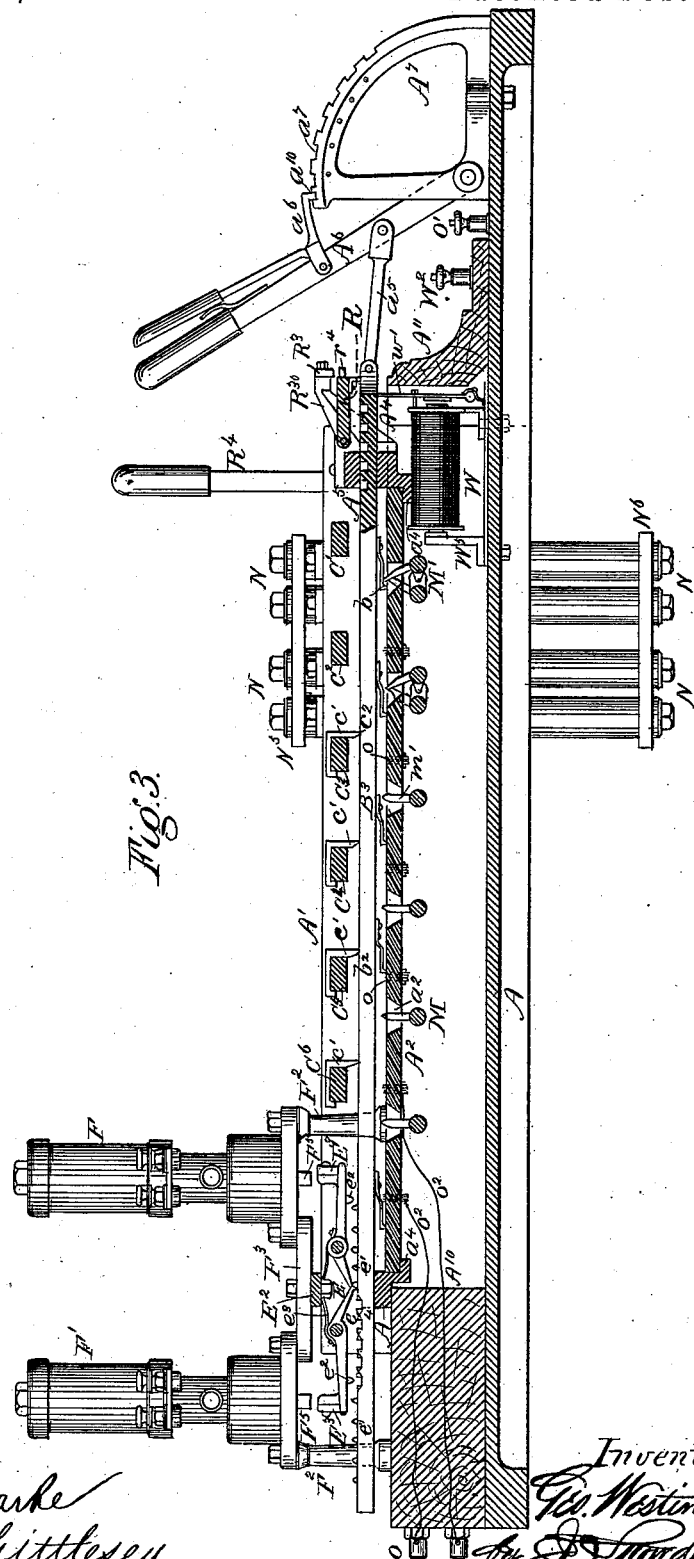
Figure 6:
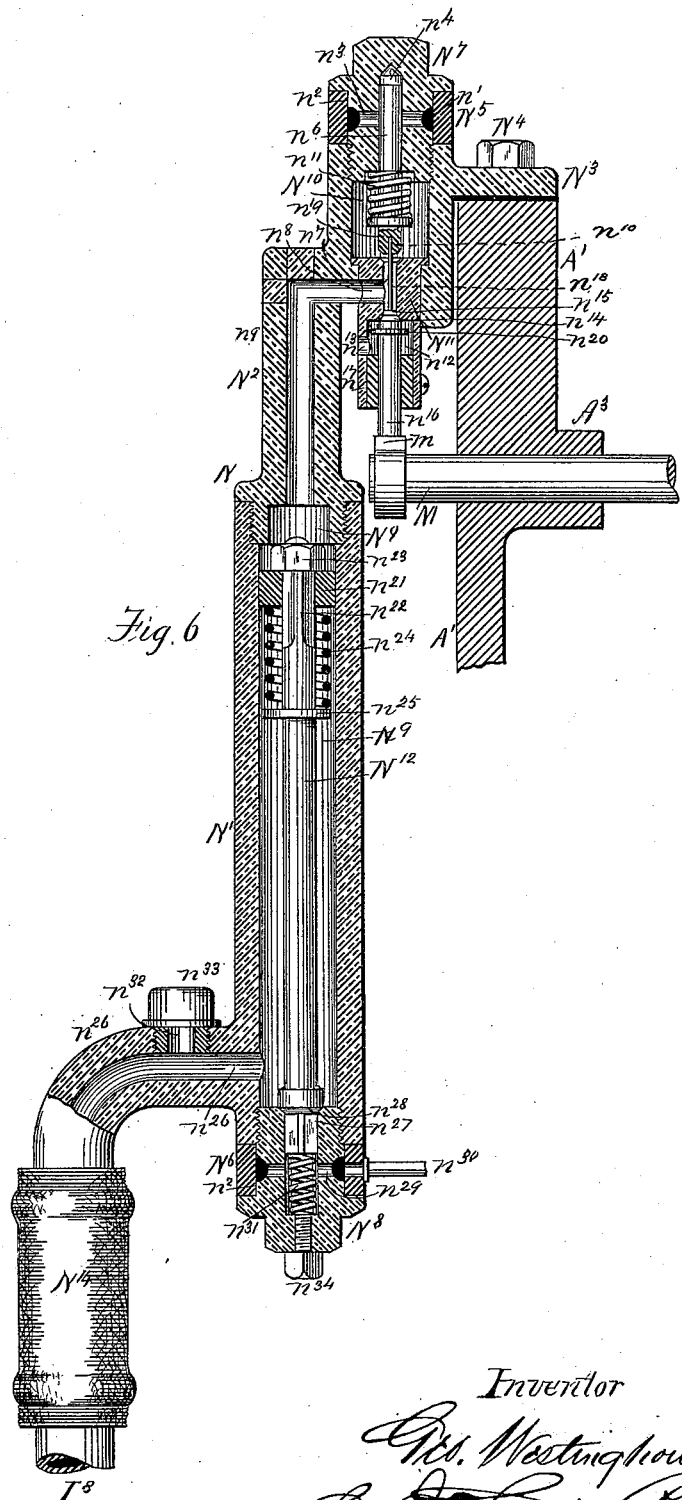
Figure 20:
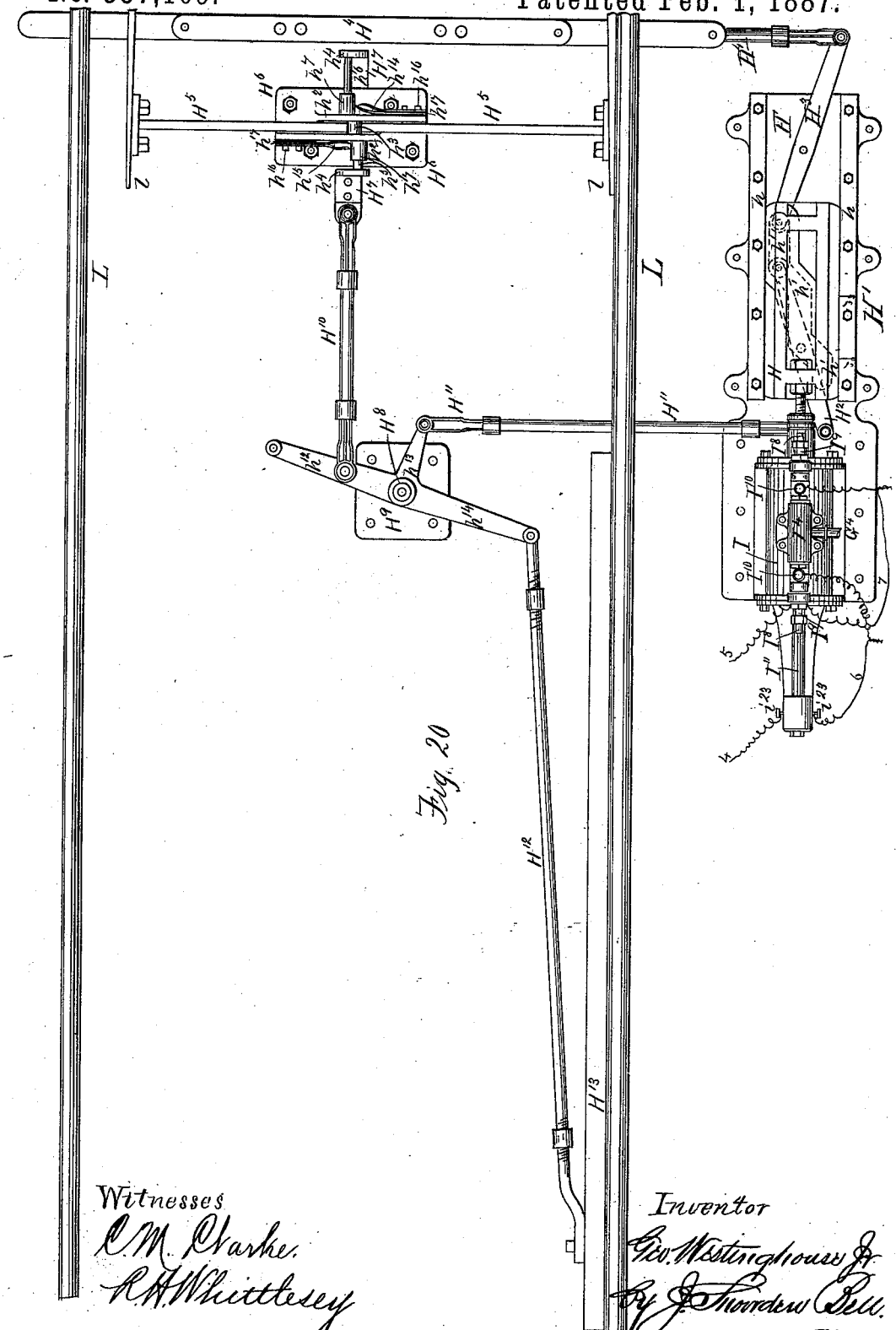
Figure 28:
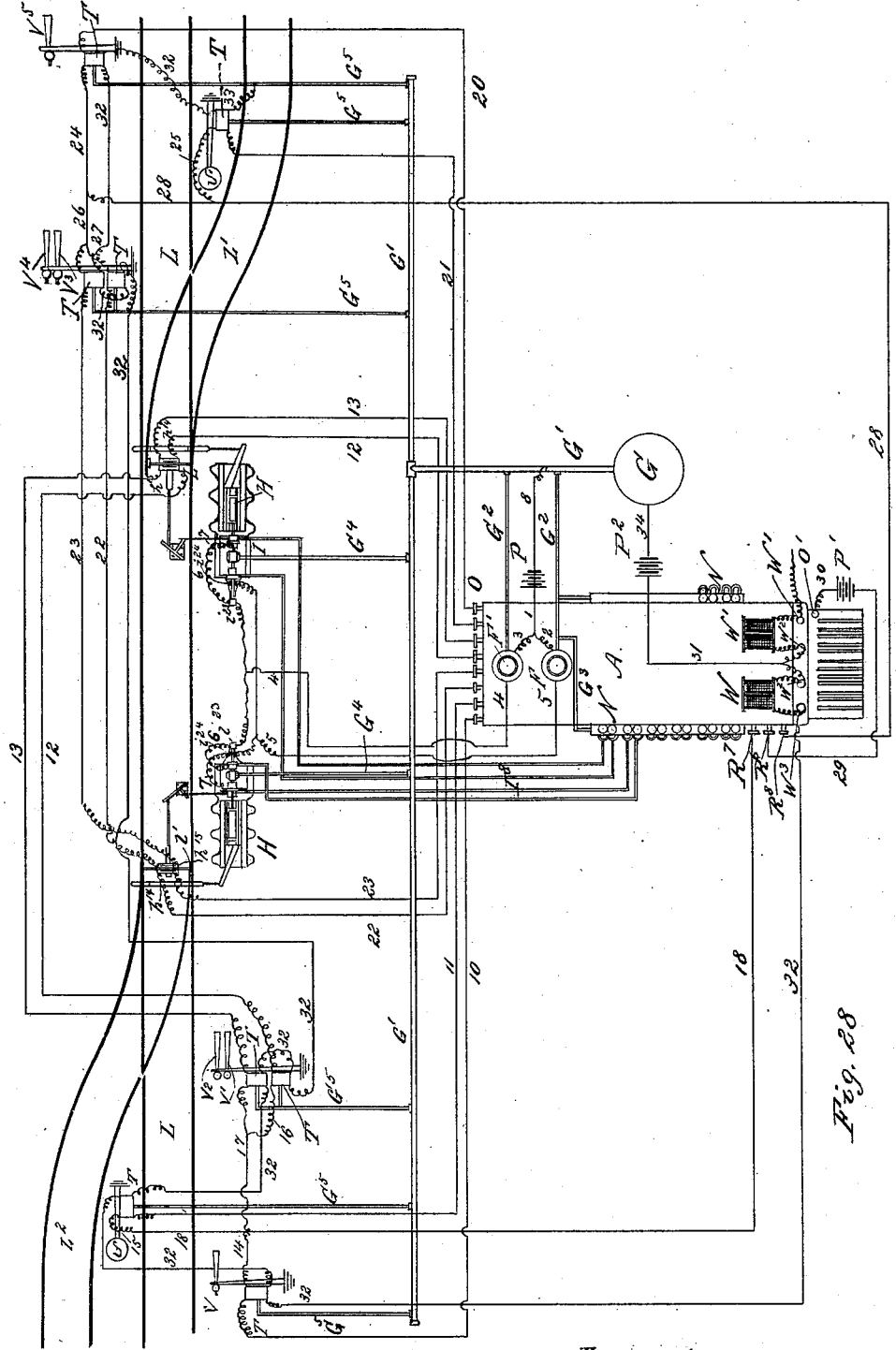

In the accompanying drawings, which make part of this specification, Figure 1, Sheet 1, is a top plan view of the interlocking apparatus. Fig. 2, Sheet 2, is a side elevation of the same. Fig. 3, Sheet 3, is a longitudinal vertical section taken in the plane of one of the sliding bars. Fig. 4, Sheet 4, is a transverse vertical section to an enlarged scale, the plane of section being indicated by the dotted line $x\,x$, Fig. 1. Fig. 5 is a detached view of a portion of a pair of valve mechanisms, illustrative of the means employed for operating them in succession. Fig. 6, Sheet 5, is a vertical sectional view to a still larger scale of one of the valve mechanisms shown in part in Fig. 5, and also on either side of Fig. 4. Fig. 7, Sheet 6, is a perspective view of portions of the sliding bars and the rocking bars, illustrative of the means employed to effect interlocking between sliding bars. Fig. 8 is a similar view of the under side of one of the rocking bars. Fig. 9, Sheet 7, is a perspective view of a portion of the bed and the mechanism directly connected therewith in operating the valve mechanisms of Figs. 4, 5, and 6, and also in making and breaking contacts for signal-circuits. Fig. 10 is a view in sectional elevation of a portion of the bed and valve-operating mechanism, and also of the locking-pawls, the same being illustrative of the relation between the lock effected by the pawls and the operation of the valve mechanism. Fig. 11, Sheet 8, is a perspective view of the cross-bar detached employed for guiding and supporting the sliding bars. Figs. 12, 13, 14, and 15 are perspective views of the springs employed to operate the valve mechanisms and to make and break contact for signal-circuits. Fig. 16 is a perspective view of a double rocking bar employed in operating the valve mechanisms. Fig. 17, Sheet 9, is a vertical sectional view of the fluid-pressure mechanisms employed to operate the locking-pawls. Fig. 18, Sheet 10, is a top plan view of one of the switch-motors and the cam-plate mechanism employed therewith. Fig. 19 is a vertical sectional view of the motor, drawn to a larger scale than Fig. 18. Fig. 20, Sheet 11, is a top plan view of the switch-motor, cam-plate, connections, and mechanism employed in operating the switch. Fig. 21, Sheet 12, is a detail view, in horizontal section, of a portion of the switch-locking mechanism and the electric-circuit make and break operated by the locking-bolts. Fig. 22, Sheet 13, is a front elevation of a portion of the interlocking mechanism, showing in part the means employed to lock the sliding bars in positions for operating signals, the scale of drawing being full size, or nearly so. Fig. 23, Sheet 14, shows in side elevation a portion of the lock mechanism operated in connection with the signals, the scale of drawing being the same as Fig. 22. Fig. 24, Sheet 15, is a vertical sectional view to the same scale as Figs. 22 and 23, the same being illustrative of locking mechanism controlled by circuits made and broken by movement of the signal-motors. Fig. 25 is a view in sectional elevation of detached portions of a sliding bar, a locking-plate, and the electrically-controlled mechanism employed to effect locking engagement between the plate and sliding bar. Fig. 26, Sheet 16, is a vertical sectional view of one of the electrically-controlled fluid-pressure motors employed to operate signals. Fig. 27 is a view in elevation of one of the motors, Fig. 26, connected to a signal and signal-post for the purpose of operating the signal to indicate "danger" and "safety," the normal or danger position being shown. Fig. 28, Sheet 17, is a diagrammatic view of a portion of a track with switches and signals and portions of my present invention applied to operate such switches and signals, the same being illustrative of the principles and operation involved in applying my invention to practical use; and Fig. 29, Sheet 18, is a diagrammatic plan of an insulated section of track with a signal and circuit, illustrating a modification of a portion of my invention.

My invention relates to interlocking mechanism for operating switches, signals, locks, and other mechanism or appliances relating to movements of trains on railroads; and, in general terms, it consists of certain combinations of fluid-pressure motors for operating switches or some part of or appliance connected with the track, valve mechanism for directing fluid-pressure upon a liquid column at a distant station to operate the motors in either direction, interlocking mechanism for operating the valves of a series or number of such motors in some predetermined order, electrically-controlled mechanism for locking the interlocking apparatus at intermediate positions, and electric circuits for controlling the intermediate locking mechanism, such circuits being made and broken both in the preliminary movements of the valve mechanism of the motors and also at the completion of their piston-stroke, electrically-controlled fluid-pressure mechanism for operating signals, circuits controlling the signal-motors, made and broken both individually and in sets by the interlocking apparatus, and also by movement of the locking mechanism, electrically - controlled mechanism for securing the interlocking apparatus in positions for operating signals, and electric circuits controlling such locking mechanism, such circuits being made and broken by operation of the signal-motors, as hereinafter more fully described and claimed.

The present invention is shown in the drawings in the form of a six-lever machine, the several parts and proportions being arranged with special reference to illustrating the several features of invention as they may be applied in different cases, rather than any given set or order of train movements which may be effected thereby. I have not therefore shown my invention applied in full to any specific condition of tracks; but from the description of construction and operation herein given those skilled in the art to which it relates will be able to apply it as the various and continually-changing conditions of use may require.

In the drawings, A represents a cast-metal base-plate, to the side edges of which are secured metal plates A'. Along the inner faces of these side plates, near their central line, (see Fig. 4,) are thickened ledges or shoulders $A^3$, which receive and support a bed-plate, $A^2$, of hard rubber, dry wood, or other suitable electric insulating material. At either end of this bed $A^2$ cross-bars $A^4$ (see Fig. 11) rest their ends upon the ledges $A^3$, and are secured in position by screw-bolts. Along the inner lower edge of the cross-bars ledges or shoulders $a^4$ project under the ends of the bed $A^2$ and support the same. These end supports, $a^4$, may either be at intervals or may extend continuously across the bars, as in Fig. 11. Longitudinally-sliding bars $B'$ $B^2$ $B^3$ $B^4$ $B^5$ $B^6$, in any desired number—six being shown in the present machine—are supported by the cross-bars $A^4$ above the bed $A^2$, parallel therewith and with each other.

In order to hold the sliding bars in proper relation to each other and to guide them in their movements, notches $a$ are made in the upper face of the front and rear cross-bars, which notches receive the sliding bars, the latter being held down at the front by bar $A^5$, secured across and above the sliding bars by bolts $a^3$, screwed into its ends through the sides A'. Any desired number of these top bars may be placed at intermediate points along the sliding bars to prevent springing upward. Beneath the guide-notches $a$ in the front cross-bar, $A^4$, notches or openings $a'$ are made, which are somewhat narrower than the notches $a$, and are sunk to the level of the upper face of bed $A^2$. These lower notches, $a'$, are designed to permit passage therethrough, when desired, of springs secured to the under face of the sliding bars, which springs will be hereinafter described.

Each of the bars $B'$ $B^2$, &c., is moved longitudinally within its guides $a$ by means of hand-levers $A^6$, connected thereto by end-pivoted rods $a^5$. Sectors $A^7$ on either side of each hand-lever guide the latter, and spring-latches $a^6$, taking into sector-notch $a^7$, afford guide-stops for setting the hand-levers and their respective sliding bars at intermediate positions or intervals of movement.

In order to limit the range or extent of movement of the sliding bars, stop-rods $a^8$ are passed laterally through suitable holes, $a^9$, in the sector-plates, which arrest movement of the hand-levers. Any number of such holes may be made with reference to placing the stop $a^8$ in any position that may be required by conditions of use.

Interlocking between the sliding bars $B'$ $B^2$, &c., is effected as follows: Rocking bars $C'$ $C^2$ $C^3$ $C^4$ $C^5$ $C^6$, corresponding, as shown in the drawings, Fig. 7, to the number of sliding bars, are pivoted at their ends to side plates, A', by screw-bolts C, such bolts having their inner ends turned smooth to form pivots, which enter suitable holes, $c^4$, in the ends of the bars. These pivot-centers are by preference in front of the central line of the bars. Springs $c$ are secured at one end—say to the bed $A^2$—and at the other or upper end they press the under rear edge of the rocking bars $C'$ $C^2$, &c., and thereby tend to lift such edge.

Arms $c'$—one for each rocking bar—are secured thereto by screws, or in other convenient way, their positions being over the respective sliding bars. These arms are extended over the front edge of the rocking bars and downward, resting at their lower extremities upon the upper faces of the sliding bars. A notch, $c^2$, is made in the upper face of each sliding bar at such point in its length that when the bar is closed, or in its normal position, as the bars $B'$ $B^4$ $B^5$ $B^6$, Fig. 7, the arm $c'$, riding on such bar, shall drop into the notch, and thereby permit the spring $c$ to turn the rocking bar to horizontal position. When any one of the sliding bars is drawn outward—as the bars $B'$ $B^3$, for example, Fig. 7—the end of arm $c'$ corresponding thereto is raised out of its notch, and the rear edge of its rocking bar is tipped down to or nearly to the face of the sliding bars. Raised stops $c^3$ on the latter bars engaging the depressed edge of the rocking bar prevent the drawing out of all the remaining or undrawn bars, or all such of them as may be provided with the stops $c^3$ immediately in rear of the rocking bar which has been tipped.

In practice it will frequently be advantageous to provide for drawing or manipulating some two or more of the sliding bars at the same time, or, in other words, that only such sliding bars should be locked by the operation of the rocking bars as in operation may make conflict in train movements. To this end the stops $c^3$ may be omitted in some instances—for example, as in Fig. 7, where no interlocking stop is shown on bars $B^5 B^6$ in rear of rocking bar $C'$, nor on bar $B^5$ in rear of rocking bar $C^2$, nor on bar $B^2$ in rear of rocking bar $C^5$.

The sliding bars which may be left unlocked by omission of stops $c^3$, as above indicated, will depend upon conditions of track, for which no general rule can be given, and they will vary more or less with different cases; but ordinarily it is advantageous to interlock only such bars as may interfere or make conflict in train movements. The principles involved in this feature of interlocking apparatus are well understood by those skilled in the art, and further description will be unnecessary in this connection.

In the first step or movement of drawing out a sliding bar the stops $c^3$ thereon are brought beneath the rocking bars, and therefore they are not shown on bars $B'$ and $B^3$, except at the end of rocking bar $C^3$, which is broken away to expose the stop. In order that the stops may not prevent movement of the rocking bars when in positions corresponding to that exposed at the end of bar $C^3$, recesses $c^5$, Fig. 8, are sunk in the under face of the rocking bars in proper positions to effect clearance between the bars and stops.

In addition to the interlocking effected between the sliding bars by means of the rocking bars and stops, as above described, I also provide two automatically-operating locking mechanisms for locking each sliding bar at intermediate intervals of its longitudinal movement, one such mechanism being at the rear end of the sliding bars, and locks the bars in successive positions for operating switches, and is controlled by electric circuits dependent upon the movements of the switch-shifting mechanism. The other automatic lock mechanism is at the front end of the sliding bars, locking the latter in successive positions for operating signals.

I will first describe the locking mechanism at the rear, or that controlling the switch movements. This locking is effected by means of two pawls, E, for each sliding bar, arranged in two sets and pivoted centrally by means of bolts or rods $E'$, passing through the side plates, $A'$, of the main frame. These pivot-rods $E'$ are separated such distance that the inner adjacent ends of the pawls, which are their locking ends, may overlap a little side by side. (See Fig. 10.) These locking ends are pressed upon the upper face of the sliding bars $B' B^2$, &c., on either side of their central line, by springs $e^3$, which are secured to the pawls back of their pivot-centers, and at their adjacent free ends they press upon the under face of cross-bar $E^2$, which is secured at its ends to the side plates, $A'$. The tension or pressure thus exerted by the springs tends to raise the tails or outer ends of the pawls and to depress their adjacent or locking ends. Ratchet-shaped notches $e$ are made in the upper face of all the sliding bars in the line of bearing of their respective pawls, the upright sides of the notches being opposite the ends of the pawls. The pawls are pressed into these notches by the springs, and in such position the sliding bars cannot be moved in either direction, except a limited play or range of movement, which is by preference provided by making the distance between the lapping pawl ends a little less than the distance between the abrupt sides of the pairs of notches. All the pawls of each are lifted simultaneously from the notches, or from their respective bars, by downward pressure upon bars $E^3$, crossing the tails of the pawls, and held in position thereon by arms $E^4$, extending to and making pivot-connection with the adjacent rod $E'$, the pawls E and arms $E^4$ being spaced and held at proper intervals on their respective pivot-rods by sleeves $e^4$.

In order to insure the entry of the adjacent or locking ends of the pawls into the notches $e'$, and also to effect a double locking action by the pawls, not only by depression of their inner ends into the notches $e$, as above described, but also by the depression of their tails or outer ends, wedge-pointed studs or pins $e^2$ are set in and extended down from the under side of the tails, which studs engage with similar studs, $e'$, set in the sliding bars in line with and beneath the tails of the pawls. These studs are so set that their engagement occurs when the inner or locking ends of the pawls are in or near the verge of the shoulders between notches. If the pawls are free, the studs will act as cams to force the ends of the pawls into the notches; but if the tails of the pawls are held down, for example, by the mechanism employed to depress them, then the studs $e^2 e'$ will form a lock intermediate between the locking-in notches $e$. A double safeguard is thus introduced, which, however, can be described more fully after describing the electrically-controlled mechanism employed to depress the tails of the pawls, and also the power mechanism employed for shifting switches and the circuit make and break connected therewith.

I will first describe the mechanism employed for lifting the ends of the pawls from the notches $e$. As above stated, this is done by downward pressure upon the cross-bars $E^3$. This pressure is imparted by two electrically-controlled fluid-pressure mechanisms, F F', supported above their respective cross-bars $E^3$, by preference in the central line of the apparatus, by bar F$^2$ and posts E$^3$. These mechanisms F F' are similar in construction, and therefore I have shown but one of them in detail, Fig. 17, and in this figure the binding-post and air-supply pipe are put on at different points than in Figs. 1, 2, and 3, simply for convenience in illustration.

In the lower portion, $f$, of the cylindrical body or shell (see Fig. 17) is a piston-chamber, $f'$, containing a packed piston, F$^4$, with a stem, F$^5$, extending downwardly therefrom through the cylinder-bottom, which stem is operative both in guiding the piston and in communicating downward movement of the piston to the pawl-bars E$^2$. Upward movement is given to the piston by spring $f^2$, surrounding its stem, and downward movement against the spring-pressure is imparted by fluid-pressure, air being preferred for this purpose, admitted to the chamber by passage $f^3$, which is formed in the central body portion, $f^4$, of the case. This central-body screws into the upper end of and forms, in effect, a head for the piston chamber or cylinder $f'$. An axial chamber, $f^5$, is formed in the central body, its lower end being closed by screw-plug $f^6$. Near the upper end of chamber $f^5$ is seated a chambered bushing, $f^7$, having a through-passage, $f^8$, and a side port communicating with passage $f^3$. A valve, $f^9$, seats upon and controls supply to the lower end of passage $f^8$, the valve being seated by action of spring $f^{10}$ on the collared stem $f^{11}$. Air or other suitable fluid under pressure is supplied to chamber $f^5$ through port $f^{12}$, which latter communicates by suitable pipe-connections, G$^2$, (see Fig. 28,) with a reservoir, G, or other suitable source of supply. The valve $f^9$ is unseated by downward pressure upon its upwardly-extending stem $f^{13}$. The upper end of passage $f^8$ communicates with an escape-port, $f^{14}$, and escape therefrom is controlled by a valve, $f^{15}$, formed on the lower end of stem $f^{16}$. The small stem $f^{13}$ of the supply-valve is passed loosely into an axial socket in stem $f^{16}$, and abuts thereon, whereby downward movement of stem $f^{16}$ opens supply-valve $f^9$ and closes escape-valve $f^{15}$, thereby permitting fluid under pressure to pass from chamber $f^5$ to passage $f^3$ to actuate the piston. Upward movement of stem $f^{16}$ opens the escape-valve $f^{15}$, and permits spring $f^{10}$ to seat the supply-valve $f^9$. The stem $f^{16}$ passes upward through the core of inner pole-piece, $f^{17}$, and makes fixed connection with or abuts against disk-like armature $f^{18}$. An electrical helix, $f^{19}$, surrounds pole-piece $f^{17}$, and is itself surrounded by exterior pole-piece, $f^{20}$. The pole-pieces $f^{17}$ and $f^{20}$ are of soft iron, and, together with the helix $f^{19}$, constitute a cylindrical magnet. A screw-cap, $f^{21}$, incloses the armature. Binding-posts $f^{22}$, secured on, but electrically insulated from, plate $f^{23}$, afford the usual provision for connecting the helix $f^{19}$ in an electric circuit. The operation of this helix in actuating the armature, thereby closing the fluid-escape and opening the supply, will be understood without further description. The supply is closed and the escape opened upon breaking circuit through the helix by action of spring $f^{10}$. The operation of the mechanism is therefore controlled by the circuit through the helix. These circuits—one for each of the unlocking mechanisms—are themselves made and broken by operation of the switch-shifting mechanism.

The switch-shifting mechanism which I employ in the present invention is shown in Figs. 18 to 21, and I will describe the same briefly before describing the features of construction in the interlocking apparatus employed to effect its operation.

In the figures referred to, I represents a fluid-pressure cylinder inclosing a movable piston, I', such piston carrying a stem, I$^2$, which passes through stuffing-box I$^3$, and makes connection outside the cylinder with a sliding plate, H, which moves upon suitable guides or ways, $h$, on the bed H'. On the under face of the plate H is a cam-groove, (shown by dotted lines,) $h'$; also two levers, H$^2$ H$^3$, are pivoted centrally to bed H', in or near the central line of the plate, such levers carrying rollers on their inner or adjacent ends, which work in the cam-groove $h'$ of the plate, and thereby give vibrating motion to the outer ends of the levers. In doing this the roller for lever H$^2$ traverses both inclined portions of the cam-groove and the intermediate straight portion, thus giving two movements to this lever in the same direction and a period of rest between such movements for each full stroke of the cam-plate. On the other hand, the roller for lever H$^3$ traverses the straight portions of the cam-groove and the intermediate inclined portion, thereby imparting a single vibrating movement to the lever for each full stroke of the cam-plate. In so doing this lever rests near the beginning and end, and moves at or near the middle of the cam-stroke; or, comparing the movements of the two levers, lever H$^2$ is first moved a part vibration, and then rests while lever H$^3$ makes its full movement. Then lever H$^3$ rests while lever H$^2$ completes its vibrating movement in the same direction as its preliminary movement. This order of movements is preserved for each stroke of the cam-plate. The single-moving lever H$^3$ is employed to shift the switch points or rails $l$, and to this end is connected therewith by the usual or any suitable bridle or rod, H$^4$. (See Fig. 20.) The two-part moving lever H$^2$ is employed to lock and unlock the switch. The switch-locking mechanism is constructed as follows, (see Figs. 20 and 21:) A locking-bar, H$^5$, connects the two switch-rails $l$ at or near their points. Beneath the center of this bar is secured a plate, H$^6$, to any suitable base or support, the locking-bar H$^5$ being movable endwise thereon between raised ribs $h^2$ and a roller, $h^3$. A bar, H$^7$, slides back and forth across the under face of plate H$^6$, being held in position on such face by any suitable guides.

At the two limits of the slide-face of bar $H^7$ are raised lugs $h^4$, carrying inwardly-extending bolts $h^5 h^6$, (see Fig. 21,) out of line with each other, but each in line with a tubular passage, $h^7$, through its adjacent rib $h^2$. The extremities of these bolts are separated a distance a little greater than the thickness of locking-bar $H^5$, or the distance between adjacent faces of the ribs $h^2$, sufficient to afford clearance and permit endwise movement of the bar between the ends of the bolts. Holes $h^8$ are made through each rib in line with the bolt-passages $h^7$, and also holes $h^{10} h^{11}$ are made through the locking-bar $H^5$, one of which, $h^{10}$, registers with the passage for bolt $h^5$ when the switch is closed or in normal position, (shown in Fig. 20,) and the other hole, $h^{11}$, registers with passage for bolt $h^6$ when the switch is open to pass a train thereon. But one of these holes $h^{10} h^{11}$ registers with a bolt-passage for either position of the switch, so that with switch closed, as in Fig. 20, the bolt $h^6$ cannot be passed through the locking-bar, but if moved inward will stop against the face of the bar. The same is true for bolt $h^5$ when the switch is open; or if the switch fails to complete its movement in either opening or closing, then neither bolt can be passed through the bar. Consequently the switch must complete its throw in a given direction before a lock can be effected, and when so thrown one bolt is prevented from locking by the absence of a registering-hole through the locking-bar.

Movement is given to the sliding bar $H^7$ to carry the bolts $h^5 h^6$ into and out of locking position by means of double bell-crank lever $H^8$, pivoted on base-plate $H^9$. One arm, $h^{12}$, of this bell-crank makes connection by end-pivoted rod $H^{10}$ with sliding bar $H^7$, another arm, $h^{13}$, makes connection by end-pivoted rod $H^{11}$ with the lever $H^2$, and a third arm, $h^{14}$, may, if desired, be connected by rod $H^{12}$ with detector-bar $H^{13}$, which latter is operative through the connections described in holding the locking-bolts in place, and thereby preventing movement of switch during passage of train over the same, substantially as described in Saxby and Farmer patent, No. 131,788, of October 1, 1882.

The unlocked position of bolts $h^5 h^6$ corresponds to the middle position of sliding bar $H^7$ and of vibrating lever $H^2$, or to the position of rest of the latter, and in this position the switch-points are moved by lever $H^3$. This being done, one, but not both, of the bolts may be passed through bar $H^5$ to lock the same. Consequently, if the switch fails to move in response to movement of the cam-plate, owing to a break in connections between the two, or to an obstruction between switch-points, or other cause, the cam-plate and its actuating-piston cannot complete their stroke, being stopped by the locking-bolt, which in such case has no registering-hole through the locking-bar. Failure to complete movement in this manner results in locking the sliding bars against movement in either direction, as hereinafter described. This feature of the locking mechanism is also employed to control electric circuits by making and breaking the same. To this end two sets of contact-springs, $h^{14} h^{15}$, are secured by bolts $h^{16}$, or otherwise, to the outer side faces of ribs $h^2$. The individual springs of each set are insulated electrically from each other and from the ribs $h^2$ by any suitable material, $h^{17}$. Normally the two springs of a set are out of contact. Their inner ends, which may make contact, are over or in line with the respective bolt-holes $h^8$, opposite the point of the corresponding locking-bolt. A stud, $h^{18}$, extends from the inner spring of each set into the holes $h^8$, in position to be pressed by the end of the bolt as it passes into locking position. Such pressure closes contact between the springs, as at $h^{14}$, Fig. 21, and thereby closes circuit connected to the springs. Pressure upon studs $h^{18}$ is made by metal pieces $h^{19}$, set in insulating-sockets $h^{20}$ in the ends of the bolts; also, insulating-plates $h^{21}$ form rests for the inner springs when the bolt is withdrawn. The locking-bar $H^5$ forms a guard for these make-and-break mechanisms, such that contact cannot be made to close circuit until the switch is in proper position therefor. For example, assuming the lock, Figs. 20 and 21, to be in position for closed switch, circuit cannot be made through springs $h^{15}$, because the bolt $h^6$ cannot be passed through the locking-bar $H^5$. Circuit is made, however, through springs $h^{14}$, and this circuit may be employed, as hereinafter described, to control a signal or some locking mechanism, or to do some other thing secondary to or dependent upon the switch movement. These relationships can be better described hereinafter, however, and will therefore be referred to again.

Movement is given to piston I', Fig. 19, to operate the cam-plate H, as above described, by fluid-pressure admitted to the cylinder by passages $i\ i$, and such fluid is exhausted by these passages and by an escape-passage, $i'$. Fluid—by preference air—under pressure is distributed to these passages by slide-valve $i^2$, which is moved on its seat by means of two pistons, $i^3 i^3$, inclosed within the cylinder-shaped valve-chamber $I^4$. These pistons are connected by a tubular stem, $i^4$, on the under side of which is a recessed enlargement, $i^5$, which receives the upper part of valve $i^2$. Fluid is admitted to chamber $I^4$ by pipe $G^4$, which leads from reservoir G, Fig. 28, or from other suitable source of supply.

In order to secure passage of fluid in comparatively small quantities past the pistons $i^3$, they may be fitted loosely in their chamber, or small vent-passages $i^6$ may be made either through the pistons or in the surface of the shell leading past the pistons. Such vents will insure equilibrium of fluid-pressure on both sides of each piston, unless escape be afforded at the ends, which may be made by ports $i^7$, opened and closed by valves $i^8$. These valves abut on their inner sides against the collared stems $i^9$; or, if preferred, they may be connected to or formed on such stems. The stems pass into the tubular stem $i^4$ and are guided thereby. Springs $i^{10}$ press the valves $i^8$ to their seats, assisted somewhat by fluid-pressure on the inner ends of stems $i^9$, admitted into tubular stem $i^4$ by port $i^{11}$. The valves $i^8$—one at either end of the valve-chamber—are opened or unseated by pressure upon stems $i^{12}$, which extend outward therefrom, through ports $i^7$ and through axial passage $i^{13}$, into a piston-chamber, $i^{14}$, such ports, passages, and chambers being formed in shells or cases $I^6$, screwed into the ends of the valve-chamber $I^4$, and forming, in effect, heads for such chamber. At their outer ends the stems $i^{12}$ terminate at or near the inner ends of stems $i^{15}$, which extend inward from the pistons $I^7$, the latter being inclosed by and movable within the chambers $i^{14}$. The pistons are moved inward to unseat the valves by fluid-pressure—by preference liquid-pressure—thereon, and to prevent leakage of liquid past the pistons and still make them sensitive to impulse communicated through the liquid, flexible diaphragms $i^{16}$ are secured across the chambers $i^{14}$, outside the piston-faces, being clamped at the periphery between abutting shoulders $i^{17}$ on the shells $I^6$ and plugs $I^9$, which latter screw into the ends of the shells and close the diaphragm or piston-chambers. The pistons are pressed upon the inner faces of their respective diaphragms by springs $i^{18}$. Suitable liquid—by preference alcohol, or other liquid not liable to congeal or freeze—fills the inclosed space outside the diaphragms, including the pipe $I^8$, which makes connection with mechanism connected with the interlocking apparatus by which impulse or pressure is imparted to the liquid column, and by it motion is given to pistons $I^7$ to open the escape-valves. By opening one of these valves in this manner—say the left-hand valve, $i^8$—fluid will escape from that side of the chamber $I^4$, and the pistons $i^3$ and valve $i^2$ will be moved toward the left, or to the position shown, Fig. 19, thereby admitting fluid-pressure to the right of main piston $I'$. In Fig. 19 the piston is shown at the right of the main cylinder, not having as yet been moved by the fluid which might enter by the opened supply-passage $i$. When it does move, it will be toward the left, or toward that end of the valve-chamber from which fluid-escape was made in order to move the valve-pistons.

By opening the escape-valves $i^8$ in succession the main piston $I'$ may be moved back and forth to open and close the switch as occasion may require.

These engines or motors are employed to operate switches, or to move other part of apparatus connected with the track, which are situated at varying distances, and often at long distances from the central station or cabin at which the interlocking apparatus is situated, and an appreciable time, though very short, is consumed between the act of imparting impulse to the liquid column, which results in opening the escape, as above described, and the completion of piston movement which follows therefrom.

In order to make the interlocking mechanisms F F', above described, dependent upon the completion of movement of the piston $I'$, or of the mechanism operated thereby, and also to prevent the possibility of obtaining during the time occupied in effecting valve movements of the engine an unlocking circuit inconsistent with a movement or position of the switch which will follow such valve movement, I make provision in the engine for making and breaking electric circuits, both by the piston movements at the ends of its strokes and also by movement of the valve-shifting mechanism preliminary to piston movement.

Make and break by the piston movement is effected as follows: A shell, $I^{11}$, is cast on and extended from one head of cylinder I, within which a stem, $i^{19}$, moves, the same being carried by the piston. On the outer end of this stem is an insulated metallic button, $i^{20}$, which makes contact at the ends or limits of piston-stroke between opposite springs, $i^{21}$ and $i^{22}$, which are secured to the inner ends of insulated binding-posts $i^{23}$ $i^{24}$. Circuits connected to these posts will be made when the button $i^{20}$ closes contact between the set of springs $i^{21}$ or $i^{22}$, and such circuits will be broken when the button is carried out of contact with the springs. As this contact between the button and springs occurs only at the ends of piston-strokes, the circuits will be made and broken by this mechanism only at such limits of piston movement.

The make and break operated by the valve-shifting mechanism is secured by contact of the inner ends of stems $i^{15}$ with the inner protruding ends, $i^{25}$, of insulated binding-posts $I^{10}$ $I^{10}$, secured one to each of the shells $I^6$ at the inner limit of movement of such stems. If circuits be connected to these binding-posts and to the metal parts of the engine, such circuits will be made by contact of stems $i^{15}$ with post-terminals $i^{25}$, as the former are moved inward for the purpose of opening the escape-valve $i^8$. On the other hand, when the force or impulse which moved the stem $i^{15}$ (communicated by the liquid column) is released, the springs $i^{18}$ will break contact between $i^{15}$ and $i^{25}$, and thus break the circuit.

In the diagrammatic view, Fig. 28, the circuits are shown through these make-and-break mechanisms and through the unlocking mechanisms F F'. As there shown, P is a battery connected from one pole by wire 1 and branches 2 3, through the helices of F F', respectively, thence by wires 4 5 to posts $i^{23}$ $i^{24}$, respectively. From the opposite post, $i^{23}$, a wire, 6, leads to post $I^{10}$ at the end of the motor adjacent to the make and break, and from post $i^{24}$ a wire, 7, leads to the post $I^{10}$ at the end adjacent to the cam-plate. Contact of stems $i^{15}$ with the posts $I^{10}$ gives circuit-connection with the metal case of the motor, which may be taken as the equivalent of ground, and return to battery may be by ground, or by pipes G⁴ G' and wire 8. With circuits thus connected, if the piston I' be actuated, carrying the cam-plate outward, circuit will be made through unlocking mechanism F, first by making contact between stem $i^{15}$ and post-terminal $i^{25}$ on the side next to the cam-plate, and at the completion of piston movement by making contact between springs $i^{22}$ $i^{22}$ and button $i^{20}$. This circuit when completed at these two points is effective in actuating fluid-pressure mechanism F, and thereby unlocking the inner set of pawls E from notches $e$, to permit drawing one or more of the sliding bars B' B², &c., outward. On the other hand, if piston movement is backward, drawing the cam-plate toward the motor, circuit will be made through unlocking mechanism F', first by making contact between stem $i^{15}$ and post-terminal $i^{25}$ opposite the cam-plate, and holding the same or renewing it when the piston I' has completed its stroke to the right, when contact will be secured both through $i^{15}$ $i^{25}$, and also between springs $i^{21}$ $i^{21}$ by button $i^{20}$. This circuit when completed actuates the unlocking mechanism F', which is effective in raising the outer set of pawls E from their notches $e$, and thereby permit of movement of the sliding bars backward. These circuit-connections for the mechanisms are given with reference to the assumption that in the normal position of switch the piston-stem is drawn the length of its stroke into the cylinder, and is thereby protected from rust, dirt, and injury.

If desired, the piston-stem may be at the limit of its outstroke for normal position of switch, and in such case the circuit through posts $i^{23}$ and post I¹⁰ nearest thereto should be connected to unlocking mechanism F. On account of better protection to the piston-stem I prefer that it should be drawn into the cylinder for normal position of switch.

The purpose may now be shown more clearly of making the unlocking circuits doubly dependent upon the switch-shifting mechanism—that is, made and broken both by the piston at the ends of its stroke and by movement of the valve-shifting mechanism preliminary to piston movement. Suppose, for example, that these unlocking circuits were made and broken by the piston movement only. One circuit or the other would be closed at each position of rest of the engine. If then, the piston being in normal position and circuit through F' closed, it were desired to move the piston to close a switch, it might be possible to open the escape $i^8$ next to the cam-plate to produce such piston movement; but before the piston moved in response to such escape the closed circuit through F' might be employed to effect a movement of the sliding bar inconsistent with the switch movement which would follow opening the escape; but by making the unlocking circuit doubly dependent, as described, this difficulty cannot arise, because both unlocking circuits are normally open at $i^{15}$ $i^{25}$, and if, after opening an escape—say the left hand, Fig. 19—the operator, by accident or design, attempts to get unlocking circuit through F' before the piston moves, he must in so doing close contact between $i^{15}$ $i^{25}$ on the right. This will open the right-hand escape, $i^8$, thereby neutralizing the effect of the previous escape on the left, so that no piston or switch movement will follow. This provision is of special importance in the present instance, in that it effectually prevents possibility of getting the sliding bars B' B², &c., into positions out of harmony with other operative parts of the apparatus connected therewith or operated thereby. This feature of making the unlocking circuits doubly dependent upon the switch-motors also performs an important function in connection with the engaging studs $e^2$ $e'$ on the pawls and sliding bars. It has been stated that these studs form a lock by their engagement so long as the tails of the pawls are pressed down. The pawls are so pressed down by the mechanisms F F' so long as circuit is continued through their helices, so that making circuit through either mechanism F F', by movement of the switch-motor, not only unlocks the sliding bars by lifting the ends of the pawls out of their notches, but also in so doing makes a new lock between the studs. Consequently, if pressure be continued upon the liquid column—say after the motor has completed its movements in response thereto—the sliding bars will be kept locked until circuit is broken between stem $i^{15}$ and post-terminal $i^{25}$, by release of pressure on the liquid column, effected as hereinafter described. When the circuit is thus broken, the locking engagement between the studs will be released, permitting them to act as cams to force the ends of the pawls into locking engagement with the succeeding notches. Thus not only are the circuits made doubly dependent upon the operation of the motors, but also locking of the sliding bars is made doubly dependent upon the circuits—that is, they are locked and unlocked both by making the circuits and by breaking them.

In the operation of the sliding bars B' B², &c., it is essential that the movement shall be step by step, and that the operator shall not be permitted to bring the lever, with its latch, beyond the first notch until the switch has been moved and locked in its place. When the electric-circuit operating mechanism F causes the pawl A to disengage from the bar, it would be possible, were it not for the stops $e'$ $e^2$, for the operator, by a quick movement, to draw the bar and lever several notches before the pawl E would be released, inasmuch as the pawl E remains raised until the pressure in the pipe leading to the small piston I⁷ is reduced. The stops $e'$ and $e^2$, engaging one with the other, prevent the bar from being moved too far until the pawl E has been relieved of pressure. The lug $e'$ also forces the pawl E to engage in its next notch in the bar in the event of the springs $e^3$ failing to do so.

I have shown the make and break for these locking circuits operated by direct connection with the motor; but I do not wish to limit my invention thereby, because substantially the same results may be secured by connecting the same to other parts of the apparatus. For example, the preliminary make and break by the valve-operating mechanism may be connected to and operated by the mechanism, presently described, which is employed to give impulse or pressure to the liquid column; or separate pistons or diaphragms may be exposed to pressure of the liquid column and the movement secured thereby be employed to make and break the locking circuits substantially described; also, instead of passing these circuits through the make and break connected with the piston, they may be connected with the switch-lock springs $h^{14}\ h^{15}$, and be made and broken by movements of the locking-bolts, which are dependent upon the switch.

If the ordinary form of switch-lock is used, which may be done, it may be preferable to make and break the locking circuits at and by the completion of switch movement; but with the improved switch-locking mechanism shown herein I prefer to employ the piston make and break for locking circuits, and reserve the make and break of the locking-bolts to control circuits to signals. This preference is due, in part at least, to the corporation of the switch-lock mechanism with the motor in preventing completion of piston-stroke, and thereby preventing the making of locking circuits unless the switch receives its full throw. If, for example, in opening the switch, connection should be broken between the cam-plate and switch-rails, the switch and its locking-bar $H^5$ would not be moved by movement of the cam-plate. Consequently the cam-plate would be stopped before the completion of its stroke by the locking-bolt $h^6$ striking against the side of the bar $H^5$. This would prevent completion of piston movement, both circuits through F and F' would be broken, and the sliding bar would be locked by the pawls, without any legitimate means available for unlocking it until the broken connection was restored. This is a material feature of advantage and security, because the circuits for the mechanisms F F' are thereby actually made dependent not alone upon completion of the piston-stroke, but also upon proper completion of switch movement.

It has been stated that the force or impulse by which the escape-valves are opened is communicated through columns of liquid inclosed in pipes $I^8$. The liquid thus used is not lessened in quantity or expended by its use, but remains substantially a constant factor, its function being to serve as a vehicle conveying or transmitting impulse or pressure communicated at one end through the length of the column to a movable part, partition, diaphragm, packed piston, or equivalent movable device at the other or motor end. The desired force or impulse may be communicated or transmitted in this manner long distances, and to secure the best results it is desirable that such force should be applied to the column quickly, powerfully, and be released abruptly or promptly.

In Figs. 4, 5, and 6 I have shown a valve-controlled mechanism designed to impart the desired force or impulse to the column by fluid-pressure, air being employed by preference, though other suitable fluid, even a liquid, may be employed for this purpose. I have also shown in the figures referred to and in others mechanism for operating a series of such valve mechanisms by movements of the interlocking apparatus.

I will first describe the valve mechanism and then the means employed to actuate or control the operation of the same. For convenience of reference I have designated this valve mechanism by the letter N. Its case or shell consists of a lower cylindrical portion, N', and an upper portion, $N^2$, of elbow form, which screws into the upper end of the lower portion. A flange or laterally-extending plate, $N^3$, affords means of attachment to the upper edge of side plate, A', as by bolts $N^4$. In connecting up a series of these mechanisms, as in Fig. 2, upper and lower connecting-bars, $N^5$ and $N^6$, are employed, having holes $n^2$, Fig. 6, therein, which receive the collared plugs $N^7$ $N^8$. These plugs, passing through the holes, screw into the ends of shells N' $N^2$, thereby connecting the shells to the bars and closing their ends. Fluid (air) supply is from reservoir G, Fig. 28, by pipes $G^2\ G^3$, which, or sections of which, are by preference of rubber for electric insulation of the interlocking apparatus. These pipes $G^3$ make connection with the top bars, $N^5$, and communicate with passages $n^4$, made longitudinally in the bars. Annular passages $n'$ in the plugs $N^7$ afford communication from passage $n$ to passages $n^3$, which lead to the axial opening $n^4$, occupied by the winged valve-stem $n^6$. Fluid-supply is past this stem downward to chamber $N^{10}$. The chamber $N^{10}$ is terminated below by a bushing or plug, $N^{11}$, through which is a downward passage, $n^7$, and also a lateral passage, $n^8$, which latter registers with the elbow-passage $n^9$ in the part $N^2$ of the shell. The passage $n^7$ is governed from above to admit or arrest fluid-supply by a valve, $n^{10}$, formed on the lower collared end of winged stem $n^6$, the valve being seated upon the upper end of passage $n^7$ by a spring, $n^{11}$, or by the weight of the valve and stem. Fluid-escape from the lower end of passage $n^7$ is through chamber $n^{12}$ and port $n^{13}$. Such escape is regulated by valve $n^{14}$, seating upward against the lower end of passage $n^7$. A pin-projection, $n^{15}$, on this valve forms practically a part of it, and entering the passage, as the valve moves toward its seat, closes the whole or a greater part of the escape, even though the conical part $n^{14}$ of the valve may not be fully seated. This valve $n^{14}\ n^{15}$ is formed on the upper end of the collared stem $n^{16}$, which extends downward through and projects below the bushing $n^{17}$; also, from the pin portion $n^{15}$ of the escape-valve a small stem, $n^{18}$, extends upward and abuts against the supply-valve $n^{10}$, or against the base of a socket, $n^{19}$, (see Fig. 6,) made axially in such valve. Upward lift upon stem $n^{16}$ will seat valve $n^{14}$, closing escape, and will open valve $n^{10}$, admitting fluid-supply. Upon releasing stem $n^{16}$ it will fall a certain distance, limited by the collar $n^{20}$ thereon, thereby opening valve $n^{14}$ and permitting valve $n^{10}$ to be seated by gravity or by action of spring $n^{11}$. Fluid admitted as above described passes through passage $n^9$ to chamber $N^9$ within the shell $N'$, and exerts its pressure upon the upper face of the piston-like valve $n^{21}$. This valve fits closely but with freedom of movement within the chamber $N^9$, and it is guided therein by the winged portion $n^{22}$ of stem $N^{12}$. A nut or collar, $n^{23}$, on the upper end of this stem forms an upper seat for the valve. The valve is held to its seat $n^{23}$ with a definite degree of pressure by spring $n^{24}$, seated upon a collar, $n^{25}$, on stem $N^{12}$. Downward pressure of fluid upon valve $n^{21}$ compresses spring $n^{24}$, unseats the valve, and opens passage through its center and between the wings $n^{22}$ to that part of the inclosed chamber beneath the valve. The liquid-inclosing pipe $I^8$ makes connection with the nipple or nozzle $n^{26}$ near the bottom of shell $N'$, any suitable liquid-tight coupling being used for this purpose, though I prefer to employ a section of rubber hose, $N^{14}$, in making this connection in order to secure electrical insulation of the interlocking apparatus.

Liquid which forms the column in pipe $I^8$ may either be admitted into the chamber $N^9$—say for two or three inches above the pipe connection or opening $n^{26}$—or it may be confined wholly within the pipes, as may be preferred. In either case the level of liquid is below the valve $n^{21}$, so that this valve is in operation subject to fluid (air) pressure both above and below.

Fluid-pressure admitted past valve $n^{21}$, as above described, is effective, both in chamber $N^9$ and in pipe $I^8$, in communicating pressure or impulse to the liquid, which impulse is transmitted promptly and with little diminution through the column, and is operative in unseating the escape-valves of the motor, Fig. 19, as above described.

In order to secure quick or prompt release of pressure or impulse upon the liquid, an exit-port, $n^{27}$, is made in or through the plug $N^8$. This exit is governed by a valve, $n^{28}$, formed on the lower end of stem $N^{12}$. This valve $n^{28}$ is seated to close its port by the weight of stem $N^{12}$ and attached devices, and also by downward pressure of inflowing fluid upon valve $n^{21}$. During continuation of fluid-supply, valve $n^{28}$ is closed and the full force or pressure of such fluid is communicated to the liquid column, as above stated; but upon arrest of fluid-supply by valve $n^{10}$, and opening of escape by valve $n^{14}$, fluid-pressure above valve $n^{21}$ will disappear. Fluid-pressure below the valve, acting upward, together with spring $n^{24}$, seats the valve upon collar $n^{23}$ and confines the fluid-pressure below. Such confined fluid pressing upward upon valve $n^{21}$, after it is seated, lifts the same, together with the stem $N^{12}$ and valve $n^{28}$, being assisted therein somewhat by a light spring, $n^{31}$, beneath the valve in chambered plug $N^8$, in case such spring is used. Opening of valve $n^{28}$ affords almost instantaneous relief to pressure upon the liquid column. In case liquid is admitted to and maintained in chamber $N^9$, such relief is afforded by flow of liquid through port $n^{27}$, passage $n^{29}$, and pipe $n^{30}$ to liquid-tank $N^{13}$. Leakage of fluid past the piston-valve $n^{21}$—such as is incident to piston-like valves—will permit the liquid in tank $N^{13}$ and in chamber $N^9$ to return to a common level in a short time.

The light spring $n^{31}$ may be employed in this connection to raise valve $n^{28}$ from its seat to permit backflow of liquid into chamber $N^9$. The amount of liquid which is thus displaced is comparatively small and is not expended or wasted, though if waste should occur from leakage at any point, or from evaporation or other cause, the requisite quantity can be maintained by additions from time to time to the quantity in the tank.

The operation of the valves $n^{21}$ and $n^{28}$ in admitting fluid-pressure and releasing the same and the action of the liquid in its limited flow from shell $N'$ to tank $N^{13}$ is automatic and self-regulating. Another feature of advantage resulting from this construction is prevention of escape or waste of liquid by being carried with the overflowing fluid to the port $n^{13}$ above, the piston-valve $n^{21}$ being effective in preventing such upward escape, and affording the required relief by opening passages to the tank; also, for the purpose of preventing upward escape of liquid, the shell $N'$ may be made some six inches (more or less) in length, whereby the valve $n^{21}$ may be at all times clearly above the level of liquid and the port $n^{26}$ be kept sealed or closed; also, to prevent communication of fluid-pressure from one liquid column to another, I prefer to make separate pipe-connection $n^{30}$ from each plug $N^8$ to tank $N^{13}$. If desired, however, the tank, with its connecting-pipes, may be omitted and the liquid column may be confined to the pipes I, which lead to the motors.

In Fig. 6, Sheet 5, I have shown by an enlarged sectional view this valve mechanism, with slight modifications in constructions, adapted more especially for use in the manner last mentioned—namely, with liquid in the pipe-connection only. In this case the nipple $n^{26}$, with which pipe $I^8$ makes connection, is curved downward, forming an elbow, at the upper angle of which is provided a hole, $n^{32}$, closed by cap $n^{33}$, or in other suitable way. This hole is designed for filling the pipe $I^8$ with liquid, which may be raised to the level of the nipple; or, if desired, a small tank like tank $N^{13}$ may make suitable pipe-connection with pipe $I^8$ or nipple $n^{26}$ at any desired point, for the purpose of affording liquid-supply, any suitable or well-known form of check-valve being employed to prevent back-pressure upon the tank when pressure is communicated to the liquid column; also, a funnel-shaped cap may be substituted for $n^{33}$, with communication therefrom to nipple-passage $n^{26}$, with an ordinary or any suitable check-valve therein to prevent discharge of liquid by back-pressure. These different methods of supplying liquid to the pipes are mentioned as obvious modifications of the means shown, and these with other like modifications I include within my invention.

In case the liquid column is confined in the pipes $I^8$, air or equivalent fluid will fill the chamber $N^9$, and it may be discharged on raising valve $n^{28}$, through port $n^{27}$ and passage $n^{29}$, directly into the outer air; or, as an equivalent, the passage $n^{29}$, and also the spring $n^{31}$, may be omitted and a port opened below by unscrewing plug $n^{34}$.

The operation of the valve mechanism in admitting fluid-pressure upon the liquid column, and also in relieving such pressure, is substantially the same whether liquid is admitted to shell $N'$ or not, and therefore I do not wish to limit my invention to any particular way of using such mechanism, nor to any particular point at which the liquid column terminates and the fluid-pressure is operative therein.

Provision is made for lifting the stems $n^{16}$, in order to admit fluid-pressure to the liquid columns, as follows: Rocking beams $m$ are connected centrally to the outer protruding ends of shafts M or $M^2$, which pass and have journal-bearings in suitable holes in side plates, $A'$ $A'$, (see Fig. 4,) the position of such shafts being midway, or about midway, between two valve mechanisms. (See Fig. 5.) The valve-stems $n^{16}$ of these two mechanisms—one on either side of the central or pivot line of a shaft—rest upon the upper face of the beam $m$ at or about equal distances from the pivot center. Rocking motion imparted to the shaft will therefore raise the stems $n^{16}$ one after the other in succession. A small amount of rocking motion will suffice to give the requisite lift to the stems to open and close the supply and escape valves $n^{10}$ $n^{14}$. In order to effect this movement by movement of the sliding bars $B'$ $B^2$, &c., pins $m'$ (see Fig. 9) are set in suitable holes, $m^2$, in the rock-shafts beneath and in line with the several sliding bars. These pins extend upward through suitable holes or openings, $a^2$, in the bed-plate $A^2$, and in the normal position of the rock-shafts the upper rounded or beveled ends of the pins project somewhat above the upper face of the bed. Springs $b$, having by preference a V-shaped rib or nib, $b'$, on the lower or free end, (see Fig. 15,) are secured to the under face of each sliding bar in such positions that the free ends shall move in the line of the pins $m'$, and in so doing the nib $b'$, or free end of such spring, presses against and moves those pins with which it may come in contact. This pressing contact of the nib upon the pin end or head may either be upon the outer or upper surface, as on the left, Fig. 10; or the nib may be drawn into the notch $b^4$ of the head, as on the right, Fig. 10. The movement thus given to the pins will impart rocking motion to the shafts, and this may be in either direction, depending upon the direction of movement of the sliding bar.

The springs $b$ are made with sufficient strength or degree of tension to operate the pins, as described, against the resistance liable to be encountered in lifting the stems $n^{16}$, and also their elasticity is such as to permit them to ride over the rounded points of the pins when the valves $n^{14}$ are seated, even though the ends of the pins should protrude above the bed. The extent of movement of sliding bar required to rock or move the pins in either or both directions is comparatively small, and the springs $b$ are by preference secured to their bars in such relation to the pins that operative contact with or movement of the pins by the springs shall occur while the locking-pawls E rest in some one of the notches $e$, and the sliding bar is thereby locked. In other words, the sliding bars are locked by the pawls in positions for moving some one or more of the pins either forward or backward, as in Fig. 10, and before the bar can be moved in either direction beyond the play provided for the pawls E in the notches $e$ the pawls must be raised from their notches by actuating one of the unlocking mechanisms F or $F'$. Consequently fluid-pressure upon the column of liquid will be sustained and electrical contact between stem $i^{15}$ and post-terminal $i^{25}$, Fig. 19, be continued until the piston $I'$ completes the stroke which it makes in response to pressure so exerted, and an unlocking circuit is obtained for mechanism F or $F'$ by the completion of such movement. Two valve mechanisms, N N, constituting a pair, operated by one bar, $m$, and shaft M, are connected, as above described, to the two ends $l^9$ of the valve-shifting mechanism of one motor, and in so doing that mechanism N actuated by drawing out the sliding bar (the rear one of each pair) is connected with that end of the motor adjacent to cam-plate H, (see Fig. 28,) and the other one of the pair (that is, the one actuated in moving the sliding bar backward toward normal position) is connected with that end of the motor remote from or opposite the cam-plate. This provision in making connections is designed with reference to moving the switch or other appliances from its normal position by drawing the sliding bar outward, and to return the switch to normal position by moving the sliding bar backward, or toward its normal position. This operation as controlled by the sliding bars is briefly as follows: In drawing one of the sliding bars outward a spring, $b$, engages a pin $m'$, either upon its surface or in its notch $b^4$, and locks the shaft M, thereby lifting the rear stem, $n^{16}$, of a pair and subjecting the liquid column connected with that mechanism N to impulse or pressure, in response to which the escape-valve $i^3$, adjacent to the cam-plate H, Fig. 18, is opened and piston I' is moved outward, or away from normal position, thereby opening the switch. (See Fig. 20.) This being done, the electric circuit through F is made, and the inner set of pawls E is raised from the notches $e$, thereby locking the sliding bar for further outward movement. In returning the sliding bar to normal position, if pins with notched heads $b^4$, as on the right, Fig. 10, are used, the nib $b'$ of the spring is drawn into the notch, and the sliding bar is then pushed backward to the limit of play of the pawls E in their notches; or, in case pins with plain ends are used, as in Fig. 9, the unlocking circuit through F may be obtained in drawing the sliding bar outward, as above described, and such bar be drawn still farther outward until the nib $b'$ of spring $b$ passes over the pin $m'$. The sliding bar may then be pushed back, making engagement between the same spring and pin, but from the other side. In so doing the pin $m'$ is tipped backward, as in the case of the notched heads $b^4$, the front valve mechanism N of the pair is actuated, the escape-valve $i^3$ of the motor opposite or most remote from the cam-plate is opened, the piston and its connnected switch are moved back to normal position, electric circuit is made through unlocking mechanism F', the outer set of pawls E is raised from the notches $e$, and the sliding bar is thus unlocked for further movement backward toward its normal position. All of these several steps or operations take place at each position of the sliding bars, for which pins $m'$ are provided. This may be one, two, or more for each sliding bar, depending upon the number of switches entering into a combination of tracks controlled by a sliding bar.

I have shown pin-holes $m^2$ in all the shafts, with corresponding holes, $a^2$, in bed $A^2$ for all the sliding bars, in order that pins may be inserted wherever required by the conditions of use.

In case it is desired to operate two or more engines simultaneously, a corresponding number of springs, $b$, may be attached to the sliding bar, to rock the appropriate pins in unison; or, if desired, rocking beams $m$ may be secured to both ends of the shafts M, and pairs of valve mechanisms N N be secured in proper position on both sides of the machine, to be operated, one of each opposite pair, by each movement of the shaft; or, if pressure upon the liquid column is sufficient, it may be divided by branching a column to two or more motors, in which case all the motors will be actuated simultaneously by the pressure or impulse on their common liquid column.

I have also shown at the right, Fig. 9, and in Fig. 16, a method of arranging two rockshafts, M' M', side by side, with a common pivot-center, $M^2$, such shafts having pins $m'$ converging upward therefrom, their upper ends protruding through the bed A in the vertical plane of the pivots $M^2$. Each shaft has one end only extending through the side plate, A', which extension forms the pivot which carries the rocking beam $m$. Within the side plates, A', each shaft M' is bent laterally out of the pivotal line, as at $m^3$, and is thus carried nearly across from plate to plate of the frame. It is then bent again in crank form, as at $m^4$, into the pivotal line, and the extreme end or point $m^5$ is seated in a socket formed in the angle $m^3$, thereby affording a second pivot which does not extend through its adjacent side plates, A'. By carrying the pins $m'$ upward into the vertical plane of the pivots $M^2$, the operation of each in rocking the pivots or shafts in both directions will be the same as in the case of the straight single shafts M, having vertical pins $m'$. The purpose of this double arrangement of rocking shafts is to provide for operating either, but not both, pairs of mechanisms N N on opposite sides of the machine by each position of a sliding bar. Economy in space and in construction of apparatus is the principal consideration in this feature of my invention, since by it double the number of pairs of valve mechanisms N N can be operated independently with a given size of machine.

The operation of the double and single rocking shafts in actuating their respective valve mechanisms N is substantially the same, and therefore need not be repeated.

In the foregoing description the pawls have been referred to more particularly to show their function in holding the sliding bars at their several positions for operating the switch or equivalent motors, and also to show the dependence of the lock thus effected upon the operation of the switch-motor. An additional function is served by them, however—namely, that of a guide to direct the operator in actuating the switch-engines. In doing this the inner set of pawls E abut against the abrupt face of notches $e$, and stop the outward movement of the sliding bar at such point or in such position that spring $b$ rocks pin $m'$ forward to cause the motor to be moved in one direction, and the outer set of pawls E, abutting against their notches $e$, stop the backward movement of the sliding bars, when spring $b$ tips the pin $m'$ backward in position to cause the motor to be moved in the reverse direction. In other words, in order to move the motor from normal position, the operator draws the proper sliding bar out until he is stopped by the inner set of pawls; or, if he wishes to return the motor to its normal position, he pushes the sliding bar backward until stopped by the outer set of pawls E.

The unlocking circuits which raise the pawls and permit further movement of the sliding bars are made automatically by the operation of the motor, in case the desired movement of the same or of the switch operated thereby is completed. Consequently the operator is automatically guided in effecting the desired movement of switch or equivalent device, and this being done the sliding bar is unlocked automatically for further movement, and this operation is the same both in drawing the sliding bars outward and in returning them to normal position.

Cases may occur in use in which it is desirable to pass over a locking-notch, $e$, in moving the sliding bar without locking the bar therein. In such case (usually known from the requirements of the track before the apparatus is put to use) such notch or notches may be filled or bridged with any suitable material sufficiently to cause the pawls to ride over without engaging the notches. When this is done, the studs $e'$ or $e^2$, corresponding to or designed to force the pawls into such filled or bridged notches, should be removed.

If all the present and future requirements of a particular instance of use could be known before constructing a machine, only such notches $e$ and studs $e'$ $e^2$ might be provided as were needed to do the required work; but as conditions of use may change, it is preferred to provide notches and studs for utilizing each sliding bar to its full capacity, and then, if desired, fill or bridge notches and remove studs wherever peculiar condition of use may make it desirable.

It has been stated that the pawl E locks the sliding bars in successive positions for operating the switch-motors. In such locked positions the spring-latches $a^6$ are about midway between the sector-notches $a^7$. On the other hand, electrically-controlled signals are operated by the sliding bars when the latches $a^6$ are within the notches $a^7$. Provision for making and breaking the signal-circuits by movement of the sliding bars in these positions is as follows: Wires or terminals $o$ are passed upward through bed $A^2$, their upper ends protruding sufficiently to make electrical contact with springs $b^2$, secured to the under face of sliding bars $B'$ $B^2$, &c. The terminals $o$ are, for convenience in construction, arranged in rows, both transversely across and longitudinally beneath the sliding bars. The transverse rows are midway or about midway between the transverse rows of pins $m'$, and two such rows of terminals, forming a pair, are made in close proximity. This feature is simply for convenience in connecting a number of terminals beneath the bed, and, if desired, all the terminals constituting such a pair of rows may be arranged in a single row. The rows, taken longitudinally, are also separated nearly the width of the sliding bars, or sufficient distance to enable the springs $b^2$, which make contact with such terminals, to pass on either side of the pins $m'$ without engaging the same.

Beneath the bed $A^2$ the transverse rows of terminals are connected by cross-wires $o'$, and from each such cross-wire a wire, $o^2$, leads backward beneath the bed through wooden tail-block $A^{10}$, and makes connection with an appropriate binding-post, O, a suitable number of such posts being secured in the rear, to which lines 10 11, &c., are attached, forming part of the signal-circuits. Each circuit-line, therefore, has terminal connections beneath such of the sliding bars as may be provided by the connections made by the cross-wires $o'$. For example, if these cross-wires connect all the terminals forming a transverse row, then the signal-circuit will have terminals beneath all the sliding bars, and if the sliding bars are connected in circuit then the circuit will be made and broken by closing and opening contact between the terminals and the springs $b^2$.

Ordinarily it is not desired to provide terminals for each signal-circuit beneath all the sliding bars, and for this reason I have shown the cross-wires $o'$ extending half-way across from each side, (see Fig. 9,) thereby dividing them into two equal groups, which in the present machine gives terminals under three sliding bars for each post-connection O. This division is in the present instance purely arbitrary, and is given simply to illustrate the manner in which cross-wires, like the wires $o'$, may be employed to connect any desired number of terminals in a transverse row—say one, two, or more—in order to provide for making and breaking a given circuit by movement of any desired number of the sliding bars, as conditions of use in different cases may suggest.

As before stated, contact is made between the springs $b^2$ and the terminals $o$ for the signal-circuits when the catches $a^6$ are in some one of the notches $a^7$; also, in order to insure complete protection against conflicting movements of the sliding bars, the latter are locked in successive positions for making and breaking the signal-circuits. This locking mechanism is operative upon the front end of the sliding bars, and is constructed as follows: Two plates, R R', (see Figs. 1, 2, 22, 23, and 24,) are pivoted near their rear or inner edge by screws $r$, which pass through the side plates, A', and into the outer ends of the plates R R', and also by a pin, $r'$, which passes transversely through a central stud or bracket, $R^{30}$, and into the inner or adjacent ends of the plates R R'. The plates are thus pivotally secured in line over the front ends of the sliding bars, the plate R being over the bars B $B^2$ $B^3$ and the plate R' over the remaining bars, $B^4$ $B^5$ $B^6$, and each plate may be raised and lowered at its front edge, turning upon its pivots $r$ $r'$. On the under face of these plates, near the front, are conical-pointed studs or pins $r^2$, three on each plate, corresponding in number to the sliding bars, which register with and enter holes $r^3$, made in the upper face of the sliding bars, when such bars are either in normal position or in position to make and break the signal-circuits.

For convenience and economy in construction, and in order to secure compactness of parts, the holes $r^3$, into which the pins or studs $r^2$ enter when the sliding bars are in normal position, and also when drawn to the second sector-notch $a^7$, are made in or at the base of the sockets in which the connecting-rods $a^5$ are pivoted. This is not essential, and, if desired, holes may be made entirely independent of the sockets; also, the holes $r^3$ are shown somewhat larger than the entering point or part of the pins $r^2$, so that a range of movement is afforded the sliding bars when the pins are in the holes, such range being equal or about equal to the play of catches $a^6$ in the sector-notches $a^7$. The purpose of this feature of construction can be described more clearly in connection with description of the operation of signals, and it will therefore be referred to again in such connection.

The plates are stopped in or about horizontal position by pins $r'$, set at proper height in the front block, A', and in this position the conical points of the studs $r^2$ enter some one of the holes $r^3$, but do not thereby lock the sliding bars unless the plates are held down or prevented from lifting on their pivots, because pressure of the sliding bars upon the inclined stud-points will otherwise lift the plates and raise the studs out of their holes. Provision is made, however, for holding these plates down, to effect a lock, both by mechanically and electrically controlled mechanism.

The following mechanical appliances are used: A bar, $R^3$, Fig. 22, is centrally pivoted to a forwardly-projecting bracket or arm, $R^{30}$, immediately in front of the adjacent ends of the plates R R'. Pins $r^4$ are set in the front edge of each plate, beneath the adjacent end of bar $R^3$, in such position that when one plate is raised its pin $r^4$ shall press the under face of the pivoted bar at one end and raise the same, carrying its other end downward onto the pin $r^4$ of the other plate, thereby holding one plate down while the other one is raised.

The other mechanical locking of the plates is effected as follows: An arm, $r^5$, Figs. 1 and 23, is extended laterally outward from the front edge of each plate, and to the outer end of each such arm is secured an arm or plate, $r^6$, which extends rearward along the outer face of the side plates, A', of the frame. A slot, $r^7$, in the rear end of these arms receives the shaft of hand-levers $R^4$, one on either side of the frame. (See Fig. 1.) These levers are pivoted to the side plates, A', below the plane of the arms, as at $R^6$, such pivot being also formed for and utilized as a binding-post to make connection of an electric-circuit wire; also, extending downward from the lower end or pivot of each lever $R^4$ $R^4$ is a make-and-break or switch spring, $r^8$, which, in the intermediate range of lever movement, is insulated by block $r^{15}$, but at the two limits of lever movement, determined by pins $r^{16}$, or other suitable guide-stops, these springs $r^8$ make contact with terminals or buttons $r^{10}$ $r^{10}$, which latter are electrically connected with two binding-posts, $R^7$ $R^8$, secured to but electrically insulated from plates $R^9$, which plates also carry the insulating-blocks $r^{15}$ and levers $R^4$, and are themselves fastened, by screws or in other convenient way, to the two sides A' of the main frame.

On either side of each lever $R^4$, immediately below the extremity of slotted arm $r^6$, is secured a centrally-notched cross-block, $r^9$. The adjustment of these blocks is such that when the levers $R^4$ stand vertical, as in Fig. 2, or with their contact-springs $r^8$ between the contact-points $r^{10}$, the nibs or enlargements $r^{11}$ on the arms $r^6$ will register with and may pass into the notch of cross-blocks $r^9$, thereby permitting plate R or R', as the case may be, to be lifted. On the other hand, if either lever $R^4$ be turned on its pivot to make contact with a button, $r^{10}$, then the full end of the cross-blocks $r^9$ (either the right or left, Fig. 23, depending upon which way the lever is moved) will be brought beneath the nib $r^{11}$, and thereby prevent raising the locking-plate R or R'; also, the arms $r^6$ are made to lock the levers $R^4$, so that they cannot be moved from one contact $r^{10}$ to the other. This is done by means of wedge or bevel pointed studs $r^{12}$, set in the upper face of the arms $r^6$, on either side of the slot $r^7$, which studs engage a pin, $r^{13}$, the ends of which project from the side faces of the lever. If the locking-plate R, Fig. 23, is held down, the engagement of studs $r^{12}$ and pin $r^{13}$ will prevent movement of the lever past or over the studs. On the other hand, if the plate is not held down, the pin $r^{13}$ may ride over the studs in either direction, and in so doing the nib end $r^{11}$ of arm $r^6$ is depressed into the notch or recess of cross-blocks $r^9$. Three mechanical locks are thus effected in connection with the movement of plates R R' on their pivots: first, lifting one plate holds the other down through the action of pivoted bar $R^3$ and pins $r^4$; second, when the lever $R^4$ is turned to make contact with either point $r^{10}$, the ends of the notched cross-blocks $r^9$ prevent depression of arms $r^6$, and thereby prevent lifting the front edge of the plates R R'; and, third, if one of the plates be held down in any way, the stud $r^{12}$ will engage pin $r^{13}$ and prevent moving lever $R^4$ from one point $r^{10}$ to the other. These several locks are all dependent upon parts of the apparatus controlled or moved by the operator. In addition to these, each plate R R' is locked and unlocked by mechanism controlled by electric circuits, which are dependent upon the operation of the signals. To this end two pairs of electrical helices, W and W', one for each plate R R', are mounted beneath their respective plates by means of suitable frames, $W^5$, secured to bed A. The armatures $w$ $w$ of these helices are secured to vertical bars $w'$ $w'$, which latter are pivoted at the foot $w^2$ to lugs or plates $w^3$ on the supporting-frames $W^5$. (See Fig. 24.) These bars $w'$ $w'$ are vibrated in one direction by the electrically-excited helices, and in the reverse direction by springs $w^4$, secured to the foot of the bars and bearing upon the helix-frame $w^5$. The bars are guided in this movement by pins or screws $w^5$, passed through them and into the helix-frame. The upper ends of the bars $w'$ $w^2$ are bent forward at or nearly at right angles, forming hooks $w^6$, (see Fig. 25,) which, when circuit is broken through the helices, are designed to engage similar hooks, $w^7$, secured to and dependent from the under faces of the respective plates R R'. This engagement forms a lock holding the plates down until circuit is made through the helices, when the engagement of the hooks will be broken.

Circuit-connection is made through the helices by attachment to posts $W^2$ $W^3$, connection of the helices therewith being made in the usual way.

In describing the notched blocks $r^9$ on levers $R^4$, it was stated that their ends coming beneath the end of arm $r^6$ effect a lock of the sliding bars beneath plate R by holding the latter down. This is true; but these blocks $r^9$ also perform another important function in connection with the engaging hooks $w^6$ $w^7$, because in the act of moving lever $R^4$ to make contact with either button $r^{10}$ $r^{10}$ the blocks $r^9$ will press the under side of arm $r^6$, and thereby force plate R down, carrying the studs $r^2$ into the holes $r^3$, and also carrying hook $w^7$ into position to make engagement with hook $w^6$. On the other hand, if anything prevents the movement of plate R to horizontal position—for example, failure of studs $r^2$ to register with the holes $r^3$—then the lever $R^4$ will be locked by blocks $r^9$ and arm $r^6$ against either contact $r^{10}$ $r^{10}$.

Before describing the signal-actuating circuits and the lock-controlling circuits dependent upon the signal mechanism, I will describe the construction and operation of the signal-operating mechanism which I prefer to employ, and also the circuit make-and-break mechanism connected with and operated by the same. In general features of construction and operation this signal-motor T, Figs. 26 and 27, is substantially like the electrically-actuated fluid-pressure motor F. (Shown in Fig. 17.) The piston $t$ of this motor (see Fig. 26) moves downward within its cylinder under fluid (by preference air) pressure admitted above through passage $t^2$, made through the chambered bushing T'. The inclosed chamber of this bushing communicates below by passage $t^3$ and port $t^{30}$ with pipe $G^5$, Fig. 27, which leads to reservoir G, Fig. 28. A valve, $t^4$, seated upwardly by spring $t^5$, governs fluid-supply to passage $t^2$, and a downwardly-seating valve, $t^6$, governs communication between passage $t^2$ and escape $t^7$. A small stem, $t^8$, extends upward from valve $t^4$ and passes loosely into an axial socket in valve $t^6$, whereby movement of either valve toward its seat will carry the other away from its seat. Consequently spring $t^5$ is effective in raising both valves, seating $t^4$ and unseating $t^6$. Valve $t^6$ is seated by movement of armature $t^9$, with which it is connected by axially-inclosed stem $t^{10}$. The armature is moved onward by force of magnets $t^{11}$ $t^{12}$, excited by electric current through helix $t^{14}$. Circuit-connection is made through the helix in the usual way by binding-posts $T^2$. Circuit made through the helix will close valve $t^6$ and open fluid-supply through valve $t^4$, thereby moving the piston downward. This movement is employed to clear the signal V, Fig. 27, by means of rod $T^3$, pivoted above to the signal-blade, as at $t^{15}$, and connected below to the protruding end of piston-stem $t'$ by yoke $t^{16}$. The counter-weight $T^4$ on the signal carries it to "danger" (that is, horizontal position) when fluid-pressure on piston $t$ is released, and in so doing the piston is also raised by the counter-weight to its normal position. (Shown in Fig. 26.) These motors (as many of them as may be desired) may be secured to the posts $T^5$ of their respective signals in any convenient position, and, if desired, may be boxed or inclosed for protection. The circuits made by movement of the sliding bars B' $B^2$, &c., and reversing-levers $R^4$ are passed through the helices of these signal-motors, and thereby control the operation of the same.

In order to make and break the circuits through the unlocking helices W W' by the movement of these motors, a plate, $T^6$, is secured to the lower end of sleeve $t^{17}$ by tubular socket $t^{18}$ at the rear edge of the plate and binding-screw $t$, or by other equivalent or well-known means of making attachment. Binding-posts $T^7$ are secured to, but electrically insulated from, this plate at or near either end. A spring, $T^8$, is secured to and makes electrical connection with one binding-post $T^7$, and crossing beneath the plate $T^6$ makes and breaks contact with the protruding terminal $t^{20}$ of the other post by movement of the piston-stem $t'$, lifting engagement being made between the stem and spring by a laterally-extending finger, $t^{21}$, secured by tapped ring or nut $t^{22}$ to the end of the stem. This make and break is operated at the upper limit of piston-stroke corresponding to or nearly to "danger" position of the signal. Consequently circuit connected to the binding-posts $T^7$ will be broken as soon as the signal begins to fall or "clear," and it will be made only upon or near complete return of the signal to "danger." This provision is made for the purpose of effecting a lock by the hooks $w^6$ $w^7$ whenever a signal is in any position other than fully at "danger."

It has been stated that the circuits which control the signal-motor T are made and broken by movement of the sliding bars and by the reversing-levers $R^4$. In addition to this, some or all of them are made dependent upon switch movements by connecting them with the make-and-break springs $h^{14}$ $h^{15}$ of the switch-lock mechanism, Figs. 20 and 21. In doing this the circuit for a signal is connected with that make and break which is closed by setting the switch for a condition of track covered or partly covered by that signal—that is, a home-signal for main track should be connected with springs $h^{14}$, Fig. 20, so as to be closed when switch is closed and opened when switch is set to move train to or from siding. On the other hand, the circuit of home-signal for switch or siding is connected with make and break $h^{15}$, so as to be closed when switch is open, or open when switch is closed. Signals having their circuits controlled in this manner cannot be cleared until the switch and its lock have been set in proper position for "clear" signals.

Any desired number of signal-circuits may be controlled in this manner by adding the requisite number of make-and-break springs to be operated by the locking mechanism; or the circuits for a set of signals controlling train movement in one direction over a given track may be connected by a common return-wire through the appropriate make and break of the switch-locking mechanism, and thereby be made dependent upon the switch movement, as above described. I do not wish, therefore, to limit my invention to any particular number of signals controlled in this manner, nor to any particular part of their circuits in which the switch-lock make and break is placed, as these features may be varied as conditions of use may require. By this provision in controlling the signal-circuits all the interdependent relations and co-operations of mechanism and circuits involved, as above described, in effecting and guarding switch movement are utilized for or made to co-operate with the mechanism and circuits employed in operating signals. This is more than mere orderly succession of operating switches and signals produced by movement of the sliding bars. It is a direct, actual, and material co-operation of that which operates to effect and guard signal movements with that which operates to effect and guard switch movements. For example, the signal-motors, their circuits, and the locking and unlocking involved in making and breaking such circuits by movement of the sliding bars are made directly dependent upon and co-operative with the switch moving and locking mechanism and the electric make and break for signal - circuits operated by such mechanism.

Before describing in detail the circuit-connections between the interlocking mechanism and the signal mechanism, it may be stated that in practice it is customary to display different signals or sets of signals for train movements in opposite directions over the same track, or combination of tracks. Consequently in connecting up the circuits regard is paid to this requirement, and provision is made in so doing for clearing either set of signals for a given condition of track at the pleasure of the operator, under such restriction that conflicting signals cannot be given at the same time.

I have illustrated by diagram, Fig. 28, a track and two switches with signals, mechanism, and circuit for operating the same by the interlocking mechanism described herein. This is given for illustration of the principles and relation of operation of the several parts in effecting switch and signal movement, and is not intended to show either the full capacity of the invention or its adaptation to any particular case of use.

In the figure referred to, A represents the frame or bed of the interlocking apparatus; F F', the electrically-actuated fluid-pressure mechanisms for controlling the locking-pawls; W W', the electrical helices, the circuits for which are dependent upon the operation of the signal mechanisms. N represents the valve mechanisms for communicating impulse or pressure to the liquid columns, which is operative through pipes $I^8$ in actuating the switch-motors. O are the binding-posts for signal-lines. $W^2$ $W^3$ are the binding-posts for connection with helices W W', and $R^6$ $R^7$ $R^8$ are the binding-posts for the return-lines from signals. The pipes $I^8$ $I^8$, containing the liquid columns, connect the valve mechanisms N N in pairs with opposite ends of the several switch-motors I. G represents the main reservoir, which may be supplied with air or other suitable fluid under pressure in any convenient way. From this reservoir any desired number of trunk-pipes, G', lead to the yard, with branches $G^2$ to the fluid-pressure unlocking mechanisms F F', branches $G^3$ to supply the valve mechanisms N N, branches $G^4$ to the valve-chambers of the switch-motors I, and branches $G^5$ to the signal-actuating mechanisms T.

Circuits are connected as follows: From posts O a line, 10, leads to distant signal V, a line, 11, to switch-signal $v$, and lines 12 13, passing through the switch-lock make and break for switch $l$, lead to home-signals V' $V^2$, for through-track L and siding L', respectively. These several signals V, V', $V^2$, and $v$ are for train movements toward the right, and from them wires 14, 15, 16, and 17 connect with common return-wire 18, which leads to post $R^7$. The signals for train movements toward the left are connected in similar manner—that is, line 20 leads from post O to distant signal $V^5$, line 21 to switch-signal $v'$, and lines 22 23, passing through the make and break of lock mechanism for switch $l'$, lead to home-signals $V^3$ $V^4$, for track L and siding $L^2$, respectively. From these respective signals wires 24, 25, 26, and 27 connect with common return-wire 28, which leads to post $R^8$. A wire, 29, leads from post $R^6$ to one pole of battery P', and from the other pole a wire, 30, leads to post O', which makes connection in any suitable way with the frame-work A A' and with the sliding bars. This frame is in use insulated from ground by dry wood or other suitable support for its base A to rest upon, and also by use of rubber sections $N^{14}$, Fig. 6, between the liquid-pipes $I^8$ and valve mechanisms N, and for like reason the air-pipes $G^2$ $G^3$ are in whole or in part of rubber hose. If, then, a sliding bar be set with its springs $b^2$ making contact with terminals $o$ for any one or more of the signal-lines 10 11, &c., circuit-connection will be made thereby from battery to such signal or signals, and returning by one or both of the lines 18

28. Then by turning lever R⁴, so as to close contact between it and post R⁷, circuit will be completed for all signals having return by wire 18, provided such of the circuits as are controlled by the switch-locking mechanism are also closed at that point. Such signals will then be cleared by action of the fluid-pressure motors T. On the other hand, if lever R⁴ be turned to make connection with post R⁸, then those signals will be cleared whose circuits, being closed between springs $b^2$ and terminals $o$, and also at the switch-locks, have their return by wire 28. Consequently, if in a given position of a sliding bar connection is made through the same for two or more signals designed to give train movements in opposite directions, none of the circuits for those signals will be completed until the lever R⁴ is turned to make contact with either the right or left post, R⁷ R⁸, and by the setting of this lever signals may be cleared for train movement in either direction, but not simultaneously in opposite directions; also, so long as lever R⁴ is turned to make circuit with either line 18 or 28 the plate R will be held down by the blocks $r^9$. Consequently the pins $r^2$ on that plate cannot be lifted from the holes $r^3$, and the sliding bars which receive those pins are locked. Before any one of these bars can be moved beyond the play provided for the pins $r^2$ in the holes $r^3$ the lever R⁴ must be moved to an intermediate position in which the nib $r^{11}$ may be depressed into the notch of block $r^9$. This provision for locking the sliding bars in positions for operating signals, and requiring that all signals which might be cleared in a given position of a sliding bar be set at "danger" by breaking their circuits before the bars are unlocked, is an important means of protection and safety. In this respect the lock effected by the engaging hooks $w^6$ $w^7$ is also an important element, and the mechanism operative in effecting the locking and unlocking last above described co-operates with the hooks in the performance of their prescribed functions. As above described, the engagement of these hooks is controlled by current through the helices W W'. Circuit for helix W is from battery P², by wire 31, to posts W², thence through helix W to post W³, thence by wire 32 to post T⁷ of the make and break on one signal—say signal V'—and through the make and break to its other post, thence through the make and break of all the other signal-motors in course which constitute sets controlled by lever R⁴ for plate R, thence by wire 33 to ground, or, as an equivalent, to the air-pipe G⁵, the other pole of battery P² being also connected to the air-pipe or its reservoir by wire 34.

In use the normal position of all signals is at "danger," and the normal position of signal-motors T is as shown in Fig. 26, its piston being raised by return of signal to "danger."

In this position circuit is closed through the make and break of the signal-motors. Consequently the circuit through helix W is a normally-closed circuit and the hooks $w^6$ $w^7$ are normally disengaged or unlocked; but as soon as any one of the signal-motors connected in this circuit begins movement to clear a signal the circuit through W will be broken, and the plate R being down the hooks $w^6$ $w^7$ engage, and all the sliding bars beneath plate R will be locked by the studs $r^2$. On the other hand, in the act of restoring the signal or signals to "danger," circuit is not made through helix W until all the signals are fully at "danger" which have make-and-break connection with the circuit. The co-operation of the lever R⁴ and block $r^9$ in forcing the plate R down in position to be engaged by the hooks in this operation has been described above, and will not be repeated. The functions thus performed in connection with the hooks not only insure the engagement of the latter, as stated, but also a return-lock upon the lever R⁴ may be effected by maintaining the engagement between the hooks, as presently described, whereby the studs $r^{12}$ will prevent moving lever R' so as to display more than one set of signals. These signal movements are themselves controlled, first, by the movement of the sliding bars; second, by movement of lever R⁴, and, third, by movement of the switch-shifting mechanisms, or such of them as have circuit-connection through the make and break of the switch-locking bolt. For example, if the sliding bars are set to make contact for circuits to certain signals for train movements in both directions, then by moving lever R to right-hand button $r^{11}$ certain signals will be cleared and circuit through helix W will be broken thereby, and the sliding bars will be locked by engagement of hooks $w^6$ $w^7$. Consequently no other movement can be given to the sliding bars beneath plate R so long as any of such signals remain clear. The same would be true if lever R⁴ made contact with left-hand button $r^{10}$; but upon turning lever R⁴ to its vertical or open position the signal-actuating circuits will be broken, their signals will go to "danger," circuit will then be completed through helix W, and the hooks $w^6$ $w^7$ unlocked. Under these conditions the sliding bars beneath plate R may be moved backward or forward, unless plate R is held down by other means. This might occur if provision were made for breaking the circuit through W and holding it open independent of the operation of the signal-motors—say, for example, by the presence of a train on an insulated section of track, X, forming part of a track-circuit through a battery, $x$, such circuit having therein a relay, Y, for making and breaking the circuit through W, as illustrated in Fig. 29. So long as circuit through W was thus broken the sliding bars would be locked by hooks $w^6$ $w^7$, whether the signals were at "danger" or "safety," until the train had passed the section. This feature of the locking mechanism, combined with track-circuits for locking the bars by presence of a train, is not claimed herein, but will form the subject-matter of a separate application for patent. One of the locking-plates—say plate R—will also be held down, through the action of pivoted bar R³, whenever the other plate, R′, is raised. The relationship of this locking between plates R R′ is this, that all the sliding bars beneath one plate, R or R′, must be either in normal position or in some position for making signal-circuits (that is, with pins $r^2$ in the holes $r^3$) before any sliding bar under the other plate can be moved; or, stated with reference to both switches and signals, if movement of any sliding bar under one plate—say plate R—is begun to effect a given train movement over a switch, such movement must be completed by setting the switch and moving the sliding bar into position to operate the signals therefor before any sliding bar under plate R′ can be moved.

This feature of the invention is not an essential one, and, if desired, may be omitted, especially when the studs $e'$ $e^2$ between the sliding bars and pawls are employed, as hereinbefore described.

I have not in the drawings shown sufficient switches and signals to require the use of any of the bars under plate R′, nor of the lever R⁴, connected therewith, nor the circuit through helix W′.

The principles of operation involved in applying these parts of the apparatus to actual use, as occasion may require, are the same as above described with relation to the plate R, helix W, and lever R⁴, connected therewith. It is therefore deemed unnecessary to repeat such description.

In determining the number of plates R R′ to be used, whether one or more, and also the number of sliding bars covered or locked by each plate, regard is had to the conditions of use in individual cases, which may permit of different train movements at the same time without conflict, and each locking-plate is by preference assigned to such individual bars as are to be interlocked as against simultaneous movements, and the bars covered by different plates are by preference such as do not necessarily interlock through the rocking bars.

In many cases a single locking-plate may be employed for all the sliding bars, especially in small yards, where but one train movement can be made at one time. On the other hand, cases may arise where three or more such plates may be used to advantage. This may be in large yards comprising many switches and signals, which are naturally divided into a number of systems or sets; also, if more than one locking-plate is used, each may be made to lock any desired number of bars, equal or unequal, as circumstances of use may make desirable. In practice I prefer to use as many locking-plates similar to R R′, with locking mechanism connected therewith, as there are sets of switches and signals which can be operated together for different movements without conflict.

The operation of the parts connected with each locking-plate is substantially the same as above described for plate R, and therefore a detail description of this operation need not be repeated.

From the above description and illustrations those sufficiently skilled in such matters can increase or decrease the number of locking-plates as circumstances of individual cases may make desirable.

In attaching the springs $b$ and $b^2$ to the sliding bars I prefer to arrange them in such manner that in normal or closed position of the sliding bars all contacts shall be broken, all motors shall be in normal position, giving through-track, and all signals shall be at "danger." With these conditions it may be desirable frequently to display "safety" signals for through-track without changing the condition of track, and preliminary to so doing to lock all sliding bars which might be employed in any way to interfere with such track. To this end the first sector-notch, $a^{10}$, corresponding to normal position of the sliding bars, is made near to the adjacent notch, $a^7$, but sufficient interval therefrom to effect interlocking by tipping of the rocking bars; also, the notch $a$ and the first notch, $a^7$, are on such part of the sectors that they are reached by the catch $a^6$ before the pawls E drop into the first inner notch $e$; or, as an equivalent of this, the first notch $e$ may be bridged or filled, as hereinbefore described, so that no locking engagement will be made by drawing the same past the ends of the pawls; also, springs $b^2$ are secured to the sliding bars in proper position to make contact with the terminals $o$ for the distant and home track signals when the catch $a^6$ is in the first sector-notch, $a^7$.

The preliminary movement of the sliding bar from sector-notch $a^{10}$ to adjacent notch $a^7$ causes interlocking through its rocking bar with all conflicting bars, contacts for the signal-circuits being made thereafter while the catch $a^6$ is in the adjacent notch $a^7$. These contacts may all be made simultaneously, or simultaneously for all at one end of the notch and for a part at the other end of the notch. I prefer the latter, in order to provide for clearing both home and distant signals at the same time, or for clearing one and holding the other at "danger." For this purpose a spring, $b^2$, Fig. 12, is used having an extended nib or contact-piece, $b^3$, on one arm, which maintains contact with its terminal $o$, while the sliding bar is moved from one limit of the sector-notch $a^7$ to the other. This contact $b^3$ makes circuit for one or more signals at any position of the catch in its sector-notch. Contact for some other signal or signals also to be used in this connection may be made by the other arm of this spring, Fig. 12, or by another spring, Fig. 13 or 14, and this contact may be at one limit of the sector-notch, so that by moving the catch and sliding bar to one side or limit of the notch circuits may be made for all the signals, or by moving the catch and sliding bar to the other limit of the notch only such circuits can be made as are connected with the terminal $o$ in contact with the long rib $b^3$. The range of movement by which these contacts are secured is provided by the play of pins $r^2$ in the holes $r^3$, and as no locking is required between the sector-notches $a^{10}$ and its adjacent notch, $a^7$, the first or end holes, $r^3$, are elongated, and in these the pins $r^2$ rest while moving from one of these sector-notches to the other.

If desired, similar provision may be made for making signal-circuits in all the sector-notches $a^7$—that is, making contacts for all the circuits of a set of signals at one limit of the sector-notch and at its other limit making contact for only some part of such circuits; or, on the other hand, all the circuits of a set may be made at one limit of a sector-notch—say the forward limit—and all circuits broken at the other limit of the notch, whereby a given set of signals may be cleared or put to "danger" by movement of the sliding bar with its catch $a^6$ in a notch, $a^7$, such movement being within the range afforded by the play of pins $r^2$ in the holes $r^3$. This last-named feature of clearing the signals or putting them at "danger" may be fully and conveniently secured by the operation of levers $R^4$ without moving the sliding bars, and therefore I prefer to employ the play or movement of the sliding bars, when locked for signals, to clear all or a part of a set of signals, as above described. This provision is made more particularly with reference to the use of the distant signals as cautionary, but permitting a train to pass them with caution and run in to the home-signal, where it will be stopped by the home-signal at "danger." On roads running fast and slow trains the distant signals are often a half-mile or more away from the home-signals, and it is often a material advantage to let a train come into home-signal under caution, as above described, in order to save time.

In describing the construction and operation of mechanism for clearing signals for main track it was said that contact for signal-circuits was made by the sliding bar before such bar was locked by the pawls. This is the case, because in normal condition of tracks all switches are closed, giving through-track, and therefore no switch movements are required before giving "clear" signals for such track. In all cases, however, where a movement of switch is involved in securing the desired condition of track, springs $b$ and $b^2$ are secured to the sliding bars in such relation to the pins $m'$ and terminals $o$ that the switch or switches shall be set before contact is made for the signal or signals covering the same.

If more than one switch is involved in the combination controlled by any one sliding bar, signals for each switch may follow their appropriate switch movement, or all the switches may be moved and contact be made thereafter for all the signals involved in moving a train in either direction over such track, circuits being closed for either set by the reversing-levers R, as before described. This relative order of switch and signal movement will in many cases be determined by peculiar conditions of track, and persons skilled in the practice and requirements of interlocking systems can arrange the order of movements to suit each case; also, in assigning duty to the several sliding bars regard should be had to the requirements of use, and therefore no rules or directions can be given covering all cases.

If desired, one sliding bar, as $B'$, may be employed to operate certain switches, and the appropriate switches, therefore, for train movement in one direction, and another sliding bar, as $B^2$, may operate the same switches with signals for movement in the opposite direction; but I prefer to employ the provisions hereinbefore described for this purpose, because cheaper and more convenient, and also because of the functions of the parts involved or operative therein in locking the sliding bars in positions for operating signals.

Any desired number of sliding bars $B'$ $B^2$ may be employed, and the number of rocking bars $C'$ $C^2$, &c., used therewith may be equal to or less than the number of sliding bars. For example, in case two sliding bars may be operated together without conflict, these bars may have a single rocking bar, to which arms $c'$ may be secured for each such sliding bar, so that in the act of drawing either sliding bar the rocking bar will be tipped; or, if desired, these two sliding bars may be placed side by side, and an arm, $c'$, be used wide enough to reach onto or over both of them, the operation being the same as though separate arms $c'$ were employed.

The sliding bars may be placed any desired distance apart, either with an appreciable space between—say nearly equal to their width, as in Fig. 1—or they may be close together, side by side, the only material advantage in the latter arrangement being economy in space and in cost, especially in large machines employing a considerable number of sliding bars.

Various other modifications of like nature in form and arrangement may be made without altering materially the functions of the several parts as herein described, all of which I include within my present invention.

In the foregoing specification I have shown and described mechanisms for performing different functions forming part of an interlocking system—such, for example, as switch-motors, switch-locks, signal-motors, make-and-break mechanisms, valve mechanisms for directing fluid-pressure upon the liquid columns, interlocking mechanism, and other parts or mechanisms which I now consider best adapted to perform the various functions assigned to them. These mechanisms, individually considered, are not claimed herein, and I do not wish to limit my present invention to the use of these specific devices, as others may be employed to perform the same or substantially the same functions in the several combinations herein claimed, which, in so far as they are equivalents of the elements of combination claimed, I include herein as within my invention. These separate mechanisms, which I prefer to employ in carrying out my present invention, have heretofore been, or will hereafter be, included in the subject-matter of separate applications for patents, and reservation is hereby made of the right to file hereafter applications for all such separate features of invention embodied herein as are not claimed in this and other applications made prior hereto.

The prior applications referred to were filed and are numbered as follows: one filed August 30, 1886, Serial No. 212,179, in which a signal-operating mechanism was described and claimed in part similar to the one employed herein; also, one filed August 20, 1886, Serial No. 212,180, and two filed and numbered, respectively, August 13, 1886, Serial No. 212,177, and September 7, 1886, Serial No. 212,913, in which the switch-motors, with the valve mechanism and the circuit make and break, are described and claimed; also, one filed August 25, 1886, Serial No. 211,819, in which interlocking mechanism is shown and described, and also certain combinations of circuits and mechanisms are set forth and claimed in some respects similar to corresponding parts and combinations employed herein. These several features and combinations included in the prior applications referred to are not claimed herein.

Also, among other features of invention for which individually-considered applications for patents will be made hereafter are the interlocking mechanism, the cam-plate mechanism, the switch-lock mechanism, and the circuit make and break operated thereby—features of improvement embodied in the signal-shifting mechanism, and other separate features of invention shown and described herein.

I claim herein as my invention—

1. The combination of a valve-governed fluid-pressure motor for moving a switch or other part or appliance belonging to or connected with a track, an inclosed fluid column for communicating impulse or movement to the valve mechanism of the motor from a distance, mechanism for imparting pressure or impulse to the fluid column, electrically-controlled mechanism for locking the pressure mechanism in position for imparting such pressure, and an electric circuit or circuits controlling the locking mechanism, such circuit or circuits being made and broken by movement of the motor, substantially as set forth.

2. The combination of two or more valve-governed fluid-pressure motors for operating switches or other part or appliance belonging to or connected with a track, inclosed fluid columns for controlling movement of the motor-valves by pressure or impulse imparted to the columns, interlocking mechanism for directing or controlling such pressure or impulse upon the several columns in prescribed order, electrically-controlled mechanism for locking the interlocking mechanism at intervals of movement, and an electric circuit or circuits controlling the lock mechanism, such circuit or circuits being made and broken by movement of the motors, substantially as set forth.

3. The combination of a valve-governed fluid-pressure motor, inclosed liquid column controlling valve movements of the motor by pressure or impulse communicated through the liquid, valve mechanism for directing fluid-pressure upon the liquid column, mechanism for opening and closing the fluid supply and exhaust valves, electrically-controlled mechanism for locking the valve-moving mechanism, and an electric circuit or circuits controlling the lock, such circuit or circuits being made and broken by movement of the motor, substantially as set forth.

4. The combination of a valve-governed fluid-pressure motor for moving a switch or other part or appliance connected with a track, two inclosed liquid columns for controlling movements of the motor in opposite directions, mechanism for imparting impulse or pressure upon the liquid columns in succession, electrically-controlled mechanism for locking the pressure mechanism in successive positions for imparting such pressure, and an electric circuit or circuits controlling the lock, such circuits being made and broken by movement of the motor, substantially as set forth.

5. The combination of two or more valve-governed fluid-pressure motors, inclosed liquid columns controlling movement of the motor-valves by pressure communicated through the liquid, valve mechanisms for directing fluid-pressure intermittently upon the liquid columns, interlocking mechanism for imparting such fluid-pressure to the several liquid columns in prescribed order, electrically-controlled mechanism for locking the interlocking apparatus in successive positions for operating the motors, and an electric circuit or circuits controlling the lock, such circuits being made and broken by movement of the motors, substantially as set forth.

6. In combination with a railway-switch, switch-locking mechanism operative in effecting a lock only upon completion of switch movement, a fluid-pressure motor for operating the switch and its lock, such motor being locked or stopped in its movement by incomplete movement of the switch-lock, mechanism for controlling fluid-supply to the motor, electrically-controlled mechanism for locking the fluid-supply mechanism, and an electric circuit or circuits controlling the electric lock, such circuits being made and broken by the motor at the limits of its movement, substantially as set forth.

7. The combination of a series of two or more switches pertaining to a track, valve-governed fluid-pressure motors for shifting such switches, switch-locking mechanism operated by the motors and movable to effect a lock only upon complete switch movement, interlocking mechanism controlling the operation of different motors in prescribed order, electrically-controlled mechanism for locking the interlocking mechanism in successive positions for operating the motors, and an electric circuit or circuits controlling the lock, such circuits being made and broken by operation of the motors at the limits of their movement, substantially as set forth.

8. In combination with a switch, a valve-governed fluid-pressure motor for shifting the switch, mechanism for shifting the valve or valves of the motor to control movement of the same, electrically-controlled mechanism for locking the valve-shifting mechanism in successive operative positions, and an electric circuit or circuits controlling the lock, such circuits being made and broken by the motor both by operation of its valves preliminary to piston-stroke and also by operation of its piston at the limits of its stroke, substantially as set forth.

9. The combination of two or more valve-governed fluid-pressure motors, interlocking mechanism controlling the operation of the motor-valves in prescribed order, electrically-controlled mechanism for locking the interlocking mechanism in positions for operating the motors, and an electric circuit or circuits for the electrically-controlled lock, such circuits being made and broken by the motors both by movement of their valve mechanisms and by movement of mechanism operated by their pistons, substantially as set forth.

10. The combination of two or more valve-governed fluid-pressure motors for shifting switches, the valve movements of such motors being controlled by pressure or impulse communicated through liquid columns, inclosed liquid columns, two for each motor, for communicating such pressure or impulse, valve mechanisms for directing fluid-pressure upon the several liquid columns, interlocking mechanism for operating the fluid-pressure valves in prescribed order, electrically-controlled mechanism for locking the interlocking mechanism in its several positions for operating the fluid-pressure valves, and two electric circuits controlling such lock, such circuits being made and broken both by the valve-operating mechanism of the motors and by movement of their pistons at the limits of piston-stroke, substantially as set forth.

11. In combination with switches connected with or forming part of a track, valve-governed fluid-pressure motors for shifting such switches, switch-locking mechanism operated by the motors and dependent in operation upon complete switch movement, interlocking mechanism for operating the motor-valves in prescribed order, electrically-controlled mechanism for locking the interlocking mechanism in positions for controlling or effecting valve movements, and two electric circuits controlling the lock, such circuits being dependent by make and break upon complete movement of the motors and of the switches and switch-locks operated thereby, substantially as set forth.

12. In combination with switches forming parts of or connected with a track, valve-governed fluid-pressure motors for shifting such switches, switch-locking mechanisms operated by the motors and dependent in operation upon complete switch movement, inclosed liquid columns operative by pressure thereon in controlling valve movements of the motors, valve mechanisms for directing fluid-pressure upon the several liquid columns, interlocking mechanism for operating the fluid-pressure valves in prescribed order, electrically-controlled mechanism for locking the interlocking mechanism in positions for operating the fluid-pressure valves, and two electric circuits controlling the lock, such circuits being dependent by make and break upon complete movement of the motors and of the switches and locks operated thereby, substantially as set forth.

13. The combination of two or more fluid-pressure motors, I, for operating switches or other movable parts of a track, interlocking sliding bars B' B², in any desired number, such bars having notches $e$ and studs $e'$ thereon, pawls E, having studs $e^2$, electrically-actuated mechanism for raising the pawls out of locking engagement with the notches, and an electric circuit or circuits actuating the pawl-lifting mechanism, such circuits being made and broken by the motors at the limits of their movement, substantially as set forth.

14. In combination with switches forming parts of or belonging to a track, fluid-pressure motors for shifting the switches, switch-locking mechanism operated by the motors and dependent in operation upon complete switch movement, interlocking sliding bars, with suitable connections, controlling by their movements the valve mechanism which governs the operation of the motors, pawls locking with the bars at intervals of their movement, electrically-controlled mechanism for locking and unlocking the pawls both in making and in breaking circuits therethrough, and two electric circuits controlling such locking mechanism, such circuits being normally open and dependent by make and break upon completion of movement of the motors, and also of the switches and switch-locks operated thereby, substantially as set forth.

15. The combination of two or more valve-governed fluid-pressure motors for shifting switches, the valve movements of such motors being controlled by pressure communicated through liquid columns, two inclosed liquid columns for each motor for communicating such pressure or impulse, valve mechanisms for directing fluid-pressure upon the several liquid columns, interlocking sliding bars operating the fluid-pressure valves in prescribed order, pawls locking the separate sliding bars in positions for operating the valves, electrically-controlled mechanism for operating the pawls, and an electric circuit or circuits controlling the pawl mechanism, such circuits being made and broken by the motors both at the limits of their piston-strokes by their valve-shifting mechanism, substantially as set forth.

16. The combination of track-switches, switch-locking mechanisms dependent in operation upon complete switch movement, valve-governed fluid-pressure motors operating the several switches and their locks, the valve movements of such motors being controlled from a distance by pressure or impulse communicated through columns of liquid, valve mechanisms for directing fluid-pressure upon and exhausting it from the liquid columns, interlocking sliding bars for operating the fluid-pressure valves in order, pawls locking with the sliding bars at intervals of their movement, two electrically-controlled mechanisms for operating the pawls, and two electric circuits controlling the same, such circuits being dependent by make and break upon complete movement of the motors and of their switches and switch-locks, substantially as set forth.

17. The combination of two or more valve-governed fluid-pressure motors, I, for shifting switches, the valve movement of such motors being controlled from a distance by pressure communicated through columns of liquid $I^3$, valve mechanisms N, for directing fluid-pressure upon the liquid columns, rock-shafts M, operating the valves of two mechanisms N for each motor, pins $m'$, interlocking sliding bars $B'$ $B^2$, in any desired number, carrying springs $b$, locking-pawls E, electrically-actuated mechanisms F F', and two electric circuits controlling the same, such circuits being dependent by make and break upon movement of the valve-shifting mechanism of the motors, and also upon completion of piston movement, substantially as set forth.

18. The combination of two or more valve-governed fluid-pressure motors for shifting switches, inclosed liquid columns for communicating pressure or impulse to the valve movements of the motors, mechanisms for directing fluid-pressure to and releasing it from said liquid columns, interlocking bars for operating said valve mechanisms to actuate the motor-valves in prescribed order, pawls locking the bars in positions for operating the valves, electrically-controlled fluid-pressure mechanisms for moving the pawls out of locking engagement with the bars, and electric circuits controlling the unlocking mechanisms, such circuits being normally open and dependent by make and break upon the valve-shifting mechanism of the motors, and also upon their piston movement, substantially as set forth.

19. The combination of interlocking bars $B'$ $B^2$, in any desired number, having notches $e$ and studs $e'$ thereon, two sets of locking-pawls, E, having studs $e^2$ thereon, and electrically-actuated fluid-pressure mechanisms F F', for operating the pawls, substantially as set forth.

20. The combination of a series of switches pertaining to a track, fluid-pressure motors for shifting the switches, switch-locking mechanism operated by the motors and dependent in operation upon complete switch movement, valve mechanisms N, governing the application and release of fluid-pressure to and from the valves of the motors, rock-shafts M, provided with pins $m'$, for operating the valves of two mechanisms, N, for each motor, interlocking bars $B'$ $B^2$, in any desired number, for operating the motors in prescribed order, such bars having springs $b$, notches $e$, and studs $e'$ thereon, two sets of pawls, E, having studs $e^2$ thereon for locking the bars at intervals of their movement, electrically-actuated fluid-pressure mechanisms F F', for operating the pawls, and two electric circuits controlling the mechanisms F F', such circuits being dependent by make and break upon complete movement of the switch-motors and of the switches and switch-locks operated thereby, substantially as set forth.

21. The combination of fluid-pressure motors for shifting switches, electrically-controlled mechanisms for operating signals, electric circuits controlling the signal mechanisms, such circuits being dependent by make and break upon complete switch movements, and interlocking mechanism for operating the switch-motors and the signal-actuating mechanism in prescribed order, substantially as set forth.

22. The combination of fluid-pressure motors for shifting switches, electrically-controlled mechanisms for operating signals, electric circuits controlling the signal mechanism, such circuits being dependent by make and break upon complete switch movements, interlocking mechanism for controlling the operations of the switch and signal mechanisms in prescribed order, electrically-actuated mechanism for locking the interlocking mechanism at intervals of movement, and electric circuits controlling the lock, such circuits being dependent by make and break upon the movements of the switch-motors, substantially as set forth.

23. The combination of switches pertaining to a track, fluid-pressure motors for shifting the switches, switch-locking mechanism operated by the motors and dependent in operation upon complete switch movement, electrically-actuated mechanism for operating signals, electric circuits controlling the signal-motors, such circuits being dependent by make and break upon complete movement of the switch-locking mechanism, interlocking mechanism for making and breaking the signal-circuits and controlling the operation of the switch-motors in prescribed order, electrically-controlled mechanism for locking the interlocking mechanism at intervals of movement, and an electric circuit or circuits controlling the lock, such circuits being dependent by make and break upon complete movement of the switch-motors, substantially as set forth.

24. The combination of valve-governed motors for operating switches, the valve movements of such motors being controlled from a distance by pressure communicated through inclosed liquid columns, switch-locking mechanism operated by the motors and dependent in operation upon complete movement of the switches, electrically-controlled mechanism for operating signals, electric circuits controlling the signal mechanisms, such circuits being dependent by make and break upon complete movement of the switch-locking mechanism, interlocking mechanism for controlling the operations of the switch and signal motors in prescribed order, electrically-actuated mechanism for locking the interlocking mechanism in positions for operating the switch-motors, and an electric circuit or circuits controlling the lock, such circuits being made and broken both by movement of the valve-actuating mechanism of the switch-motors and by its piston movement at the limit of its strokes, substantially as set forth.

25. In combination with switches and signals for effecting different train movements on a system of tracks, valve-governed fluid-pressure motors for shifting the switches, the valve movements of such motors being controlled by pressure communicated to the valve mechanism through inclosed liquid columns, switch-locking mechanism operated by the motors, and with them being dependent for completion of movement upon a full throw of switch, valve mechanisms for governing supply and exhaust of fluid-pressure upon the liquid columns of the motors, electrically-controlled mechanism for operating the signals, electric circuits controlling the signal mechanism, such circuits being dependent by make and break upon completion of movement of the switch-locks, and interlocking mechanism for making and breaking the signal-circuits and for operating the fluid-pressure valve mechanisms in prescribed order, substantially as set forth.

26. In combination with switches and signals pertaining to a track, fluid-pressure motors for shifting the switches, electrically-controlled mechanisms for operating the signals, electric circuits for controlling signal movements, such circuits being dependent by make and break upon completion of switch movements, interlocking mechanism for making and breaking the signal-circuits and controlling the movements of the switch-motors in prescribed order, electrically-controlled mechanism for locking the interlocking mechanism in positions for making and breaking the signal-circuits, and electric circuits for such locks, the circuits being made and broken by movement of the signal mechanism, substantially as set forth.

27. The combination of power mechanism for shifting switches, power mechanism for operating signals, interlocking mechanism controlling the operations of the switch and signal mechanisms in prescribed order, electrically-controlled mechanism locking the interlocking mechanism in positions for operating switches, electrically-controlled mechanism locking the interlocking mechanism in positions for operating signals, an electric circuit or circuits controlling the lock for switch-shifting positions, such circuits being made and broken by movement of the switch-shifting mechanism, and an electric circuit or circuits controlling the lock for signal-operating positions, such circuits being made and broken by movement of the signal mechanism, substantially as set forth.

28. In combination with switches and signals for effecting different train of movements on a track, valve-governed fluid-pressure motors for shifting the switches, switch-locking mechanism operated by the motors, and with them dependent for completion of movement upon complete throw of switch, electrically-controlled fluid-pressure motors for operating the signals, electric circuits controlling the signal-motors, such circuits being dependent by make and break upon completion of movement of the switch-locks, interlocking mechanism for making and breaking the signal-circuits and for operating the valve mechanism of the switch-motors in prescribed order, electrically-controlled mechanism for locking the interlocking mechanism in positions for operating the switch-motors, electric circuits controlling such lock, such circuits being dependent by make and break upon complete movements of the switch-motors, electrically-controlled mechanism for locking the interlocking mechanism in positions for making and breaking the signal-circuits, and a circuit or circuits controlling the lock for signaling positions, such circuits being dependent by make and break upon the movements of the signal-motors, substantially as set forth.

29. The combination of fluid-pressure motors for shifting switches, fluid-pressure motors for operating signals, interlocking bars for controlling the movements of the switch and signal motors in prescribed order, valve mechanisms for governing the application and release of fluid-pressure to and from the valves of the switch-motors, electric circuits for controlling the movements of the signal-motors, electrically-controlled mechanism for locking the bars in positions for operating the switch-motors, electric circuits controlling such lock, the circuits being dependent by make and break upon the movements of the switch-motors, electrically-controlled mechanism for locking the bars in positions for operating signals, and an electric circuit or electric circuits controlling such lock, such circuits being dependent by make and break upon the movements of the signal-motors, substantially as set forth.

30. In combination with switches and signals pertaining to a track, fluid-pressure motors for shifting the switches, electrically-controlled fluid-pressure motors for operating signals, electric circuits controlling the signal-motors, such circuits being dependent by make and break upon complete throw of switch, interlocking bars for making and breaking the signal-circuits and controlling the movements of the switch-motors in prescribed order, valve mechanism governed by said interlocking bars and effecting the application and release of pressure to and from the valves of the switch-motors, electrically-controlled mechanism for locking the bars in positions for making and breaking the signal-circuits, and an electric circuit or circuits controlling the lock, such circuits being dependent by make and break upon movement of the signal-actuating mechanism, substantially as set forth.

31. In combination with train-signals for a track, electrically-controlled fluid-pressure motors for operating the signals, electric circuits controlling the motors, and interlocking mechanism for making and breaking the signal-circuits in prescribed order, substantially as set forth.

32. In combination with train-signals for a track, fluid-pressure motors for operating the signals, interlocking mechanism controlling the movements of the motors in prescribed order, electrically-controlled mechanism for locking the interlocking mechanism in positions for controlling signal movements, and an electric circuit or circuits controlling the lock, such circuits being made and broken by movement of the signal-actuating mechanism, substantially as set forth.

33. In combination with train-signals for a track, electrically-controlled fluid-pressure motors for operating the signals, electric circuits controlling the motors, interlocking mechanism for making and breaking the signal-circuits in prescribed order, electrically-controlled mechanism for locking the interlocking mechanism in its make and break positions, and an electric circuit or circuits controlling the lock, such circuits being dependent by make and break upon the movements of the signal-actuating mechanism, substantially as set forth.

34. In combination with two sets of signals for train movement in different directions on a track, electrically-controlled power mechanism for operating the several signals, electric circuits controlling said mechanism, the circuits for separate sets of signals having connection with separate points of an electric switch for closing either set of circuits with battery, interlocking bars for making and breaking signal-circuits in prescribed order, electrically-controlled mechanism locking the bars, and a circuit or circuits therefor, such circuits being dependent by make and break upon movement of the signal-actuating mechanism, substantially as set forth.

35. In combination with train-signals for a track, electrically-controlled mechanism for operating the signals, electric circuits controlling such mechanism, interlocking mechanism for making and breaking the circuits in prescribed order, an electric switch making circuit-connection for different signals by different positions of the switch, and mechanism for locking part or all of the interlocking bars at intervals of their movement, such mechanism being held in locking engagement with the bars by the switch mechanism when in position for closing circuits, substantially as set forth.

36. In combination with track-signals, electrically-controlled mechanism for operating the signals, electric circuits controlling the signal mechanisms, interlocking bars for making and breaking the circuits in prescribed order, an electric switch making circuit in its different positions for different signals, and mechanism engaging the interlocking bars at intervals of their movement, and held in locking engagement therewith by the switch mechanism when in positions for making signal-circuits, and also by an electrically-controlled lock having its circuit or circuits made and broken by movement of the signal-actuating mechanism, substantially as set forth.

37. The combination of track-signals, mechanism for operating the signals to indicate "danger" and "safety," interlocking mechanism for operating the signal mechanisms in prescribed order, electrically-controlled mechanism for locking the interlocking mechanism in position for operating the signals, and an electric circuit or circuits dependent by make and break upon movement of the signals from "safety" to "danger," such circuits being operative through the locking mechanism in effecting a lock when any of the signals are put to "safety," and releasing such lock when all the signals are at "danger," substantially as set forth.

38. The combination of track-signals, electrically-controlled mechanism for operating the signals to indicate "danger" and "safety," electric circuits controlling such signal mechanisms, interlocking bars for making and breaking the signal-circuits in prescribed order, electrically-controlled mechanism for locking the bars in positions for making and breaking signal-circuits, and a circuit or circuits controlling the locking mechanism, such circuits having make-and-break connection with the signal-actuating mechanism, and being operative thereby in effecting a lock of the bars when any of the signals indicate "safety," substantially as set forth.

39. In combination with track switches and signals, fluid-pressure motors for shifting the switches, switch-locking mechanism operated by the motors and dependent in operation upon complete switch movement, electrically-controlled mechanism for operating the signals, circuits controlling such signal mechanism dependent by make and break upon the switch-locking mechanism, interlocking bars for operating the switch-motors and making and breaking the signal-circuits in prescribed order, electrically-controlled mechanism for locking the bars in positions for making and breaking such circuits, and a circuit or circuits controlling the locking mechanism, such circuits having make-and-break connection with the signal-actuating mechanisms, and being operative thereby in effecting a lock of the bars when any of the signals indicate "safety," substantially as set forth.

40. In combination with track switches and signals, fluid-pressure motors for shifting the switches, switch-locking mechanism operated by the motors and dependent, with the motors, in operation upon complete throw of switch, electrically-controlled mechanism for operating the signals to indicate "danger" and "safety," electric circuits controlling the signal mechanisms, interlocking bars for making and breaking the signal-circuits and operating the switch-motors in prescribed order, valve mechanisms governed by said interlocking bars and effecting the application and release of pressure to and from the valves of the switch-motors, electrically-controlled mechanism for locking the bars in positions for operating the switch-motors, and electric circuits for such locking mechanism dependent by make and break upon complete movement of the switch mechanism, electrically-controlled mechanism for locking the bars in positions for making and breaking signal-circuits, and a circuit or circuits controlling such locking mechanism, such circuits having make-and-break connection with the signal-actuating mechanisms, and being operative thereby in effecting a lock of the bars when any of the signals indicate "safety," and in releasing such lock when all the signals are at "danger," substantially as set forth.

41. In combination with switches and signals pertaining to a track, valve-governed fluid-pressure motors for shifting switches, liquid columns controlling the valve mechanism of the motors by pressure communicated through the liquid from the distant end of the columns, valve mechanism for controlling supply and exhaust of fluid-pressure upon the liquid columns, valve-governed fluid-pressure motors for operating the signals to indicate "danger" and "safety," electric circuits for controlling the movements of the signal-motors, interlocking mechanism controlling movements of the switch and signal mechanisms in prescribed order, electrically-controlled mechanism for locking the interlocking mechanism in positions for operating the signals, and an electric circuit or circuits controlling such locking mechanism, such circuits having make-and-break connection with the signal-actuating mechanism, and being operative thereby in effecting a lock of the bars when any of the signals indicate "safety," and releasing such lock when all the signals are at "danger," substantially as set forth.

42. The combination of sliding bars $B'$ $B^2$, in any desired number, locking-plates $R$ $R'$, in any desired number, a hand-operated electric switch, and mechanism, substantially as described, for holding a plate, $R$ or $R'$, in locking engagement with one or more of the sliding bars when the switch is in position to make electrical circuit therethrough, substantially as set forth.

43. The combination of sliding bars $B'$ $B^2$, in any desired number, locking-plates $R$ $R'$, in any desired number, and electrically-controlled mechanisms for each plate operative by make and break of electric current therethrough in effecting and releasing locking engagement between its plate $R$ and one or more of the sliding bars, substantially as set forth.

44. The combination of one or more sliding bars, $B'$ $B^2$, &c., a pivoted locking-plate, $R$ or $R'$, for such bars, hooks $w^6$ $w^7$, and electrically-controlled mechanism for effecting engagement and release of the hooks to lock and unlock the sliding bars, substantially as set forth.

45. The combination of an electric switch, sliding bars $B'$ $B^2$, in any desired number, for making and breaking circuits through the switch, locking-plate $R$ or $R'$ for bars $B'$ $B^2$, carrying an arm extending to and operative as a stop upon the movement of the switch when plate $R$ is held in locking position, and a stop or block carried by the switch and operative with the arm when the switch is closed in preventing movement of plate $R$ out of locking position, substantially as set forth.

46. The combination of one or more electric switches, interlocking bars $B'$ $B^2$, in any desired number, for making and breaking electric circuits, locking-plates $R$ $R'$, in any desired number, carrying extended arms operative with the switches in forcing the respective plates into locking position, and electrically-controlled mechanism engaging and holding the plates in their locking positions, substantially as set forth.

47. The combination of interlocking bars $B'$ $B^2$, in any desired number, having holes $r^3$ at intervals therein, pivoted plates $R$ $R'$, in any desired number, carrying studs or pins $r^2$, adapted to enter the holes, and thereby lock the bars with a limited range of movement, and electrically-controlled mechanism for engaging and holding the plate or plates in locking position and releasing the same by make and break of electric current through the locking mechanism, substantially as set forth.

48. In combination with train-signals, electrically-controlled mechanisms for operating the signals to indicate "danger" and "safety," electric circuits controlling the signal mechanism, interlocking bars for operating signals in prescribed order, electrically-controlled mechanism for locking the bars at intervals of their movement, with a limited range or play of movement for the bars in locked positions, an electric circuit or circuits controlling the locking mechanism, such circuits being made and broken by movement of the signal mechanism, and make-and-break mechanisms for the signal-circuits, operated by movement of the interlocking bars, a part of such circuits being open, or all being closed, according to the position of the bars within their limited range of movement when locked for signaling, substantially as set forth.

49. The combination of interlocking bars, electrically-controlled mechanism for locking the bars at intervals of their movement, with a limited range or play of movement in their locked positions, a hand-operated electric switch, electrically-controlled mechanisms for operating two sets of signals for train movements in opposite directions, and electric circuits controlling the signal mechanisms, such circuits being made and broken in sets by movement of the hand-switch, and also a part of the circuits of each set being broken, and all being closed according to the position of the bars within their limited range of movement when locked for signaling, substantially as set forth.

50. In combination with two sets of signals for train movements in opposite directions, electrically-controlled mechanisms for operating the several signals to indicate "danger" and "safety," interlocking bars, electrically-controlled mechanism for locking the bars at intervals of movement, an electric circuit controlling the locking mechanism, such circuit being connected by make and break with the signal-operating mechanisms, and being operative therewith in locking the bars when any of the signals are put to "safety," and in freeing the bars when all the signals are at "danger," an electric switch, and electric circuits controlling the signal mechanisms, such circuits being made and broken in sets by the switch, and a part of such circuits being open, or all being closed, according to the position of the bars within their limited range of motion when locked for signaling, substantially as set forth.

51. The combination of mechanism for operating signals, interlocking bars B' B², in any desired number, controlling signal movements in prescribed order, a pivoted locking-plate, R, electrically-controlled mechanism for holding the plate in locking engagement with the bars, and an electric circuit controlling the lock, such circuit being made and broken by the movements of the actuating mechanism, substantially as set forth.

52. The combination of electrically-controlled mechanisms for operating signals, electric circuits controlling the signal mechanisms, interlocking bars B' B², in any desired number, for making and breaking the signal-circuits in prescribed order, pivoted locking-plates R R', in any desired number, for locking the sliding bars in positions for making and breaking the signal-circuits, electrically-controlled mechanisms for holding each of the plates R R' in locking engagement with its appropriate interlocking bars, and electric circuits controlling the locking mechanisms, each such circuit being made and broken by movement of those signal-actuating mechanisms which are controlled by bars locked by means of such circuit, substantially as set forth.

53. The combination of electrically-controlled fluid-pressure mechanisms T for operating signals, electric circuits for such signals, interlocking bars B' B², in any desired number, for making and breaking the signal-circuits in prescribed order, a plate, R, for locking the bars in positions for making and breaking the signal-circuits, hooks $w^6$ $w^7$, for holding the plate in locking engagement with the bars, electrically-controlled mechanism for making and releasing engagement between the hooks, and an electric circuit controlling the hook-actuating mechanism, such circuit being made and broken by movement of the signal-motors T, substantially as set forth.

54. The combination of electrically-controlled fluid-pressure motors T, electric circuits controlling such motors, interlocking bars B' B², in any desired number, for making and breaking such circuits in prescribed order, an electric switch for making and breaking the circuits in sets, a plate, R, for locking the bars, hooks $w^6$ $w^7$, for holding the plate in locking position, electrically-controlled mechanism for effecting and releasing engagement of hooks, and a circuit controlling such mechanism, such circuit being made and broken by movement of the switch-motors T, substantially as set forth.

55. The combination of interlocking bars B' B², in any desired number, hand-levers $A^6$, carrying spring-catches $a^6$ thereon, sector-guides $A^7$, having notches $a^7$, receiving the catches $a^6$, with freedom of movement therein, plates R R', in any desired number, for locking the bars at intervals of movement, and electrically-controlled mechanism for holding the plates in locking positions, the bars having a limited range of movement in such locked positions, substantially as set forth.

56. The combination of interlocking bars B' B², in any desired number, hand-levers $A^6$, carrying spring-catches $a^6$, sector-guides $A^7$, having periphery-notches $a^7$, for receiving the catches, the bars having a limited play or range of movement with their catches $a^6$ in the notches $a^7$, electrically-controlled mechanisms for operating track-signals for a train movement, and electric circuits for the signal mechanisms, such circuits being made for a part of the signals controlling such train movement when the catch $a^6$ is at one limit of a notch, $a^7$, and for all the signals controlling such movement when the catch is at the other limit of the notch, substantially as set forth.

57. The combination of electrically-controlled mechanism for operating signals, electric circuits controlling such signal mechanisms, interlocking bars for making and breaking the signal-circuits in prescribed order, two or more pivoted plates, each movable into and out of locking engagement with some of the bars, and mechanism for holding one such plate in locking engagement with its bars when another plate is raised to free its bars, substantially as set forth.

58. In mechanism for operating switches and signals in prescribed order, the combination of interlocking bars B' B², in any desired number, two sets of pawls, E, studs $e'$ $e^2$, electrically-controlled mechanisms F F', plates R R', in any desired number, each being movable into and out of locking engagement with the bars when the latter are in positions for operating signals, and electrically-controlled mechanisms for effecting and releasing locking engagement between each such plate and its appropriate bars, substantially as set forth.

59. The combination of interlocking bars B' B², in any desired number, hand-levers A⁶, carrying spring-catches $a^6$, sector-guides A⁷, having periphery-notches $a^7$, which receive the catches, the interlocking bars having a limited range of movement with their catches $a^6$ in such notches $a^7$, a spring or springs secured to the bars, making contact with terminals $o$ at any position of the catch in its notch, a spring or springs secured to the bars and making contact with terminals $o$ when the catch is at one limit of such notch, electrically-controlled mechanisms for operating two or more signals, and electric circuits controlling said mechanisms connected with the bars and with different terminals $o$, a part of such circuits being made and broken by the springs which make contact with their terminals in all positions of the catch within its notch, and others of the circuits being made and broken by the spring which makes contact when the catch is at one limit of its notch, substantially as set forth.

60. The combination, with track-signals, of mechanism for moving the signals to indicate "danger" and "safety," interlocking mechanism for operating such signals in prescribed order, electrically-controlled mechanism for locking the interlocking mechanism in its positions for operating the signals, and an electric circuit made and broken by movement of the signal-actuating mechanism near positions indicating "danger," substantially as set forth.

61. In combination with a track, two sets of signals controlling train movements over the track in opposite directions, interlocking mechanism for operating such signals in prescribed order to indicate "danger" and "safety," electrically-controlled mechanism for locking the interlocking mechanism in successive positions for operating the signals, and an electric circuit controlling such lock, such circuit being made and broken by movement of the actuating mechanisms of both sets of signals, substantially as set forth.

62. The combination of signals for a track, mechanism for moving the signals to indicate "danger" and "safety," interlocking mechanism for operating the signals in prescribed order, electrically-controlled mechanism for locking the interlocking mechanism in positions for operating the signals, and a circuit controlling such lock, the circuit being connected by make-and-break mechanisms with the signal-actuating mechanisms, and being normally closed therethrough when signals are at "danger," thereby unlocking the interlocking mechanism, such circuit also being broken by movement of the signals toward "safety," thereby effecting a lock of the interlocking mechanism, substantially as set forth.

63. In combination with signals for train movements on a track, electrically-controlled mechanism for moving the signals to indicate "danger" and "safety," electric circuits controlling such mechanisms, the normal or "danger" position of signals corresponding to open circuit, interlocking mechanism for making and breaking the signal-circuits in prescribed order, electrically-controlled mechanism for locking the interlocking mechanism in positions for making and breaking circuits, and an electric circuit or circuits controlling the lock, such circuits being connected with the signal mechanism and normally closed therethrough when all the signal-circuits are open and the signals at "danger," but opened by movement of a signal or signals to indicate "safety," substantially as set forth.

64. The combination of interlocking mechanism for operating switches and signals in prescribed order, electrically-controlled mechanism for locking the interlocking mechanism in successive positions for operating signals, and a circuit or circuits controlling the locking mechanism, such circuits being normally closed and operative thereby in effecting a release of the lock, engagement of the lock being effected upon breaking circuits, substantially as set forth.

In testimony whereof I have hereunto set my hand.

GEO. WESTINGHOUSE, Jr.

Witnesses:
J. SNOWDEN BELL,
R. H. WHITTLESEY.